United States Patent [19]

Okada et al.

[11] Patent Number: 5,393,275
[45] Date of Patent: Feb. 28, 1995

[54] SHIFT CONTROL SYSTEM FOR MANUALLY SHIFTABLE AUTOMATIC TRANSMISSION

[75] Inventors: Takayuki Okada, Toyota; Yutaka Taga, Aichi; Yasuo Hojo, Nagoya; Atsushi Tabata, Okazaki; Masato Kaigawa, Toyota; Shuzo Moroto, Nagoya; Takeshi Inuzuka, Anjo; Masashi Hattori, Anjo; Yoshito Takeshita, Anjo, all of Japan

[73] Assignees: Toyota Jidosha Kabushiki Kaisha, Toyota; Aishin AW Co., Ltd., Anjo, both of Japan

[21] Appl. No.: 51,748

[22] Filed: Apr. 26, 1993

[30] Foreign Application Priority Data

Apr. 24, 1992 [JP] Japan .................... 4-106635
Jun. 18, 1992 [JP] Japan .................... 4-159457
Jun. 19, 1992 [JP] Japan .................... 4-161241

[51] Int. Cl.$^6$ ............................ F16H 59/04
[52] U.S. Cl. ............................ 477/81; 74/335; 364/424.1
[58] Field of Search .......... 74/335, 867; 364/424.1; 477/70, 79, 80, 81

[56] References Cited

U.S. PATENT DOCUMENTS

| | | |
|---|---|---|
| 4,905,530 | 3/1990 | Stehle et al. . |
| 4,987,792 | 1/1991 | Mueller et al. . |
| 5,009,128 | 4/1991 | Seidel et al. . |
| 5,044,220 | 9/1991 | Raff et al. . |
| 5,056,376 | 10/1991 | Moroto et al. . |
| 5,062,314 | 11/1991 | Maier et al. . |
| 5,070,740 | 12/1991 | Giek et al. . |
| 5,127,288 | 7/1992 | Hojo et al. ............ 364/424.1 |

FOREIGN PATENT DOCUMENTS

| | | |
|---|---|---|
| 0321992 | 6/1989 | European Pat. Off. . |
| 0350018 | 1/1990 | European Pat. Off. . |
| 4035726 | 5/1991 | Germany . |
| 4124550 | 1/1992 | Germany . |
| 61-157855 | 7/1986 | Japan . |
| 2-203065 | 8/1990 | Japan . |

OTHER PUBLICATIONS

Patent Abstracts of Japan, vol. 12, No. 083 (M-667), Mar. 16, 1988, JP-A-62 224 764, Oct. 2, 1987.

*Primary Examiner*—Edward K. Look
*Assistant Examiner*—James A. Larson
*Attorney, Agent, or Firm*—Oblon, Spivak, McClelland, Maier & Neustadt

[57] ABSTRACT

A shift control system for an automatic transmission, includes: a plurality of frictional engagement elements adapted to be hydraulically engaged for setting a plurality of gear stages; and a shift lever for switching between an automatic mode, in which a gear stage is set on the basis of the running state of a vehicle, and a manual mode in which a gear stage is selected by manipulating the shift lever. A shift detector detects that a gear stage should be selected for the shift in the manual mode state and a shift start timing adjuster, if the shift in the manual mode state is detected, the switching rate of the frictional engagement elements which are switched for executing the detected shift.

12 Claims, 37 Drawing Sheets

FIG. 3

| POSITION | | | SOLENOID | | | CLUTCH | | | BRAKE | | | |
|---|---|---|---|---|---|---|---|---|---|---|---|---|
| | | | $S_{L1}$ | $S_{L2}$ | $S_{L3}$ | $C_1$ | $C_2$ | $C_0$ | $B_1$ | $B_2$ | $B_3$ | $B_0$ |
| D | AUTO. | 1ST | ○ | × | × | ○ | × | ○ | × | × | × | × |
| | | 2ND | ○ | ○ | × | ○ | × | ○ | × | ○ | × | × |
| | | 3RD | × | ○ | × | ○ | ○ | ○ | × | ○ | × | × |
| | | 4TH | × | × | × | ○ | ○ | × | × | ○ | × | ○ |
| | MANU. | 1ST | ○ | × | ○ | ○ | × | ○ | × | × | ○ | × |
| | | 2ND | ○ | ○ | ○ | ○ | × | ○ | ○ | ○ | × | × |
| S | | 1ST | ○ | × | × | ○ | × | ○ | × | × | × | × |
| | | 2ND | ○ | ○ | ○ | ○ | × | ○ | ○ | ○ | × | × |
| | | 3RD | × | ○ | × | ○ | ○ | ○ | × | ○ | × | × |
| | | (3RD) | × | × | × | ○ | ○ | ○ | × | ○ | × | × |
| L | | 1ST | ○ | × | ○ | ○ | × | ○ | × | × | ○ | × |
| | | 2ND | ○ | ○ | ○ | ○ | × | ○ | ○ | ○ | × | × |
| | | (1ST) | × | × | × | ○ | × | ○ | × | × | ○ | × |

| REMARKS | ○ : ON | ENGAGE |
|---|---|---|
| | × : OFF | DISENGAGE |

FIG.18

| POSITION | | | SOLENOID | | | CLUTCH | | | | BRAKE | | | |
|---|---|---|---|---|---|---|---|---|---|---|---|---|---|
| | | | SL1 | SL2 | SL3 | C1 | C2 FIRST | C2 SECOND | C0 | B1 | B2 | B3 | B0 |
| D | AUTO | 1ST | O | × | × | O | × | × | O | × | × | × | × |
| | | 2ND | O | O | × | O | × | × | O | × | O | × | × |
| | | 3RD | × | O | × | O | O | O | O | × | O | × | × |
| | | 4TH | × | × | × | O | O | O | × | × | O | × | O |
| | MANU | 1ST | O | × | O | O | × | × | O | × | × | O | × |
| | | 2ND | O | O | O | O | × | × | O | O | O | × | × |
| | | 3RD | × | O | O | O | O | × | O | × | O | × | × |
| S | | 1ST | O | × | × | O | × | × | O | × | × | × | × |
| | | 2ND | O | O | O | O | × | × | O | O | O | × | × |
| | | 3RD | × | O | × | O | O | × | O | × | O | × | × |
| | | (3RD) | × | × | × | O | O | × | O | × | O | × | × |
| L | | 1ST | O | × | O | O | × | × | O | × | × | O | × |
| | | 2ND | O | O | O | O | × | × | O | O | O | × | × |
| | | (1ST) | × | × | × | O | × | × | O | × | × | O | × |
| REMARKS | | | O : ON | | | | | | ENGAGE | | | | |
| | | | × : OFF | | | | | | DISENGAGE | | | | |

FIG. 27

T$_A$ MAP

| | KINDS OF SHIFT | | |
|---|---|---|---|
| | 1 → 2 | 2 → 3 | 3 → 4 |
| $\theta_0$ | 300 ms ↑ | 250 ms ↑ | 200 ms ↑ |
| $\theta_1$ | | | |
| $\theta_2$ | | | |
| $\theta_3$ | | | |
| $\theta_4$ | | | |
| $\theta_5$ | 400 ms ↑ | 300 ms ↑ | 250 ms ↑ |
| $\theta_6$ | | | |
| $\theta_7$ | | | |

THROTTLE OPENING ( $\theta_0 < \theta_1 < \text{---} < \theta_7$ )

SHIFT CONTROL SYSTEM FOR MANUALLY SHIFTABLE AUTOMATIC TRANSMISSION

BACKGROUND OF THE INVENTION

The present invention relates to a shift control system for a manually shiftable automatic transmission and, more particularly, to a shift control system for an automatic transmission capable of switching a manual shift mode for selecting a gear stage on the basis of a manual operation and an automatic shift mode for selecting a gear stage on the basis of a running state.

In the automatic transmission of the prior art, the power generated by an engine is transmitted through a fluid coupling to a transmission mechanism for achieving one of gear stages. For this achievement, the transmission mechanism is equipped with a plurality of planetary gear units which are composed of elements including ring gears, carriers and sun gears, so that the elements may be selectively engaged/disengaged by frictional engagement means to achieve the gear stages.

For engaging/disengaging the frictional engagement means, there is further provided an oil pressure circuit for pumping a pressure-regulated working fluid to and from a hydraulic servo mechanism corresponding to each of the frictional engagement means, so that the frictional engagement means may be engaged/disengaged at a predetermined timing.

Moreover, the automatic transmission of the prior art is provided with individual ranges including P (parking), R (reverse), N (neutral), D (drive), S (second) and L (low) ranges, one of which is selected according to the intention of a driver to effect a shift automatically.

In an automatic transmission having four forward stages and one reverse stage, for example, an automatic shift is effected among the first to fourth speeds in accordance with the running conditions such as the vehicle speed and the throttle opening if the driver selects the D-range. If the S-range is selected, the shift is automatically effected among the first to third speeds. If the L-range is selected, the shift is automatically effected between the first and second speeds. The selection of each range according to the intention of the driver is carried out by moving the shift lever to the corresponding range position arrayed on a straight line. In other words, the range position can be selected from the "I"-shaped array.

Incidentally, the automatic transmission described above does not allow the gear stages to be freely selected in the manual manner so that it fails to give a good shifting feel. Thus, there has been proposed an automatic transmission in which the shift lever is turned in a shift passage to come into contact with a sensor so that a gear stage may be achieved in response to the electric signal of the sensor (as disclosed in Japanese Patent Laid-Open No. 8545/1990 or 125174/1990). In another proposal (as disclosed in Japanese Patent Laid-Open No. 157855/1986), there is provided a shift pattern which has the so-called "H-pattern" shift position like the manual shift in addition to the "I-pattern" range position used in the existing automatic transmission so that the automatic transmission can select a run in an automatic shift mode and a run in a manual shift mode.

The existing automatic transmission described above can provide a shifting feel because the driver can achieve a predetermined gear stage by manipulating the shift lever. However, the automatic transmission employs the same transmission mechanism, the same oil pressure circuit for actuating the transmission mechanism and the same control system for controlling the oil pressure circuit as those of the prior art and is constructed to prevent highly frequent shifts. Thus, the shift is not started before a predetermined time period elapses from the manipulation of the shift lever by the driver. This delays the shift response even in the manual shift mode so that the shifting feel is deteriorated.

SUMMARY OF THE INVENTION

An object of the present invention is to enable an automatic transmission capable of switching an automatic shift mode and a manual shift mode to improve the shift response in case the manual shift mode is selected.

In order to achieve this object, the shift control system according to the present invention is equipped with shift start timing means for advancing the timing, at which frictional engagement means for executing a shift starts its switching operation if vehicle speed detecting means detects the shift in the manual shift mode.

The shift start timing means includes means for raising the line pressure or the back pressure of an accumulator, or means for reducing the number of chambers to be fed with the oil pressure in the frictional engagement means, and means for shortening the time period from the shift decision to the output of a shift command signal.

According to the control system of the present invention, therefore, the time period from the instant when the shift in the manual shift mode is decided to the instant when the frictional engagement means taking part in the shift begins to engage thereby to start the shift actually is shortened to improve the shift response.

Moreover, in case the raise control of the oil pressure is carried out by the shift control system of the present invention, the pressure raise control is limited to the time period between the shift decision and the actual start of the shift, and the pressure drop control is effected immediately before the shift is actually started. Then, it is possible to prevent in advance a disadvantage that the oil pressure in an inertia phase is either raised to an unnecessarily high level or dropped to an abnormally low level by the delay in response of the oil pressure control.

The above and further objects and novel features of the present invention will more fully appear from the following detailed description when the same is read with reference to the accompanying drawings. It is to be expressly understood, however, that the drawings are for purpose of illustration only and are not intended as a definition of the limits of the invention.

BRIEF DESCRIPTION OF THE DRAWINGS

FIG. 3 is an application chart of frictional engage means for setting individual gear stages in an automatic shift mode and in a manual shift mode;

FIG. 18 is an application chart of frictional engage means for setting individual gear stages in the automatic transmission which is equipped with the double chamber type piston;

FIG. 27 is a diagram showing one example of the map which determines the initial values of the pressure raising time;

DETAILED DESCRIPTION OF THE PREFERRED EMBODIMENTS

Figure 1:
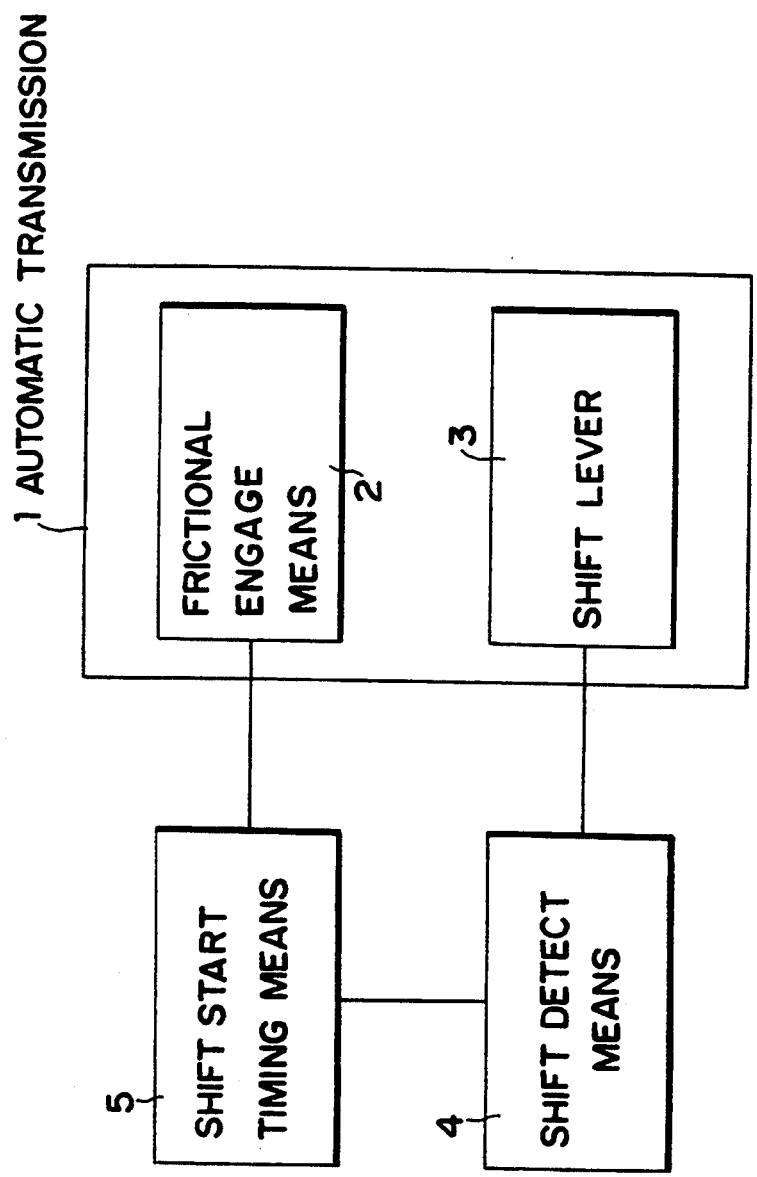
FIG. 1 is a schematic block diagram showing a basic construction of the present invention with functional means.

First of all, a basic construction will be described in the following. As shown in FIG. 1, an automatic transmission 1, to which is applied the present invention, is constructed of a plurality of frictional engagement means 2 such as clutches and brakes, and a shift lever 3 for selecting an automatic shift mode and a manual shift mode. A control system for controlling the automatic transmission 1 is equipped with a shift detecting means 4 for detecting that a shift should be effected by selecting a gear stage in the manual shift mode. Specifically, this shift detecting means 4 is constructed of an electronic control unit composed mainly of a microcomputer and decides, on the basis of an input signal produced by manipulating the shift lever 3, that the shift mode is manual and that a gear stage other than the present one is selected. The aforementioned control system is further equipped with shift start timing means 5 for accelerating the switching rate of the aforementioned frictional engagement means 2 if the shift detected is in the manual shift mode. This shift start timing means 5 includes: means for accelerating the timing for the frictional engagement means 2 to start its engagement by raising the line pressure or the back pressure of an accumulator; means for reducing, if chambers for the frictional engagement means is in plurality, the number of chambers to be fed with the oil pressure; and means for shortening the time period from the decision of a shift to the output of a shift command signal. If, on the other hand, the oil pressure for engaging the frictional engagement means 2 is raised, the control of the shift start timing means 5 is effected only for a time period from the decision of the shift to the actual start of the shift. In this case, the oil pressure once raised is preferably dropped just before the start of the shift, and the control for this drop is carried out.

The shift start timing means 5 includes any of the aforementioned various means and is constructed of an electronic control unit composed mainly of a microcomputer, and hydraulic control units to be controlled by the electronic control unlit, as will be specifically described hereinafter.

Figure 2:
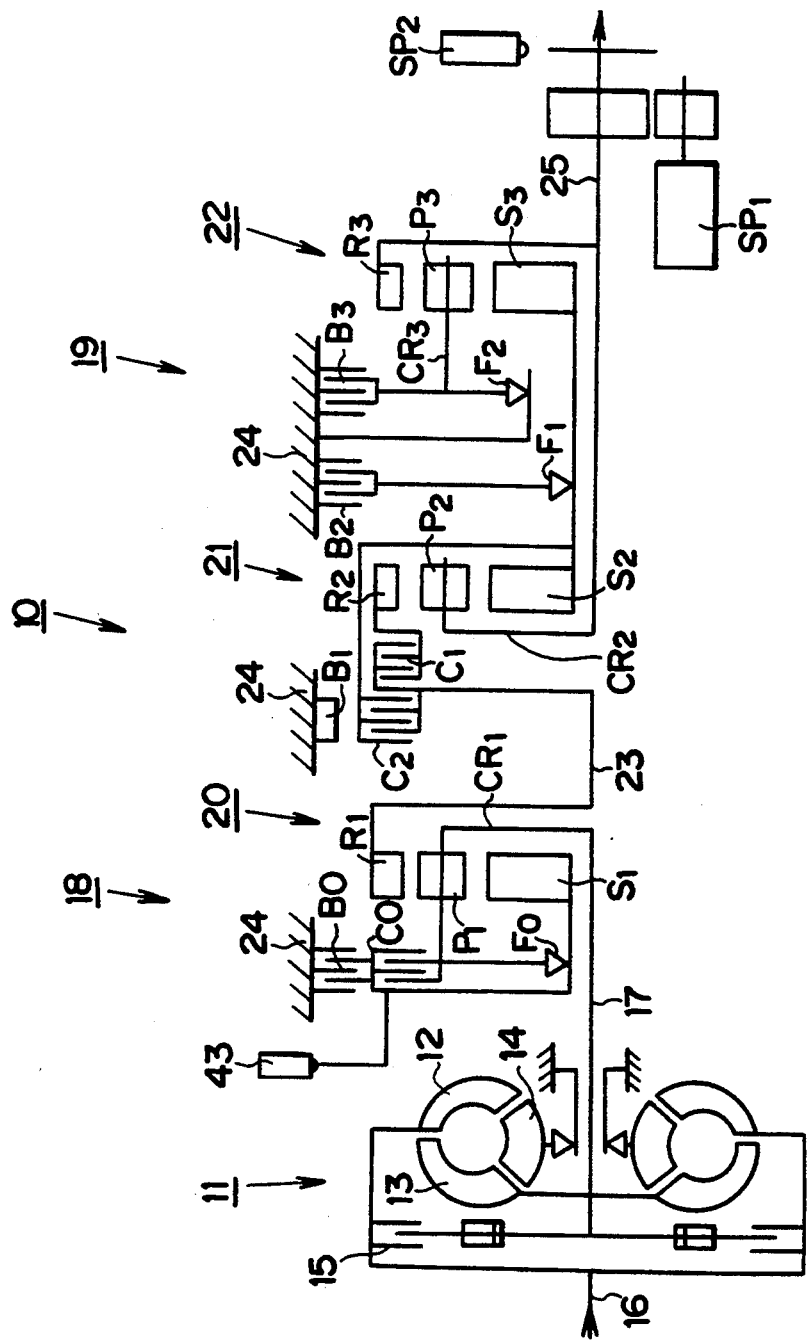
FIG. 2 is a skeleton diagram showing one example of a gear train of an automatic transmission.

An embodiment of the present invention will be more specifically described in the following. Here will be described an automatic transmission (T/M) 10, to which is applied the present invention. This automatic transmission 10 is equipped, as shown in FIG. 2, with a torque converter 11 for transmitting the power generated by an engine, and shift units 18 and 19 for changing the number of revolutions per minute (RPM). The torque converter 11 is composed of a pump impeller 12, a turbine runner 13, a stator 14 and a lockup clutch 15 for improving the power transmission efficiency. The revolution of an input member 16 is transmitted indirectly to the input shaft 17 of the shift unit 18 through the flow of oil in the torque converter 11 and directly to the input shaft 17 by locking the lockup clutch 15.

On the other hand, the shift units 18 and 19 constituting the gear trains of the automatic transmission 10 are auxiliary and main ones, respectively. The auxiliary shift unit 18 is composed of an overdrive planetary gear unit 20, and the main shift unit 19 is composed of a front planetary gear unit 21 and a rear planetary gear unit 22.

Here, the overdrive planetary gear unit 20 is connected to the input shaft 17 and is composed of a carrier CR1 supporting a planetary pinion P1, a sun gear S1 surrounding the input shaft 17, and a ring gear R1 connected to the input shaft 23 of the main shift unit 19. Moreover, a third clutch C0 and a third one-way clutch F0 are interposed between the carrier CR1 and the sun gear S1, and a fourth brake B0 is arranged between the sun gear S1 and a casing 24.

Next, the front planetary gear unit 21 is connected to an output shaft 25. This front planetary gear unit 21 is composed of a carrier CR2 supporting a planetary pinion P2, a sun gear S2 enclosing the output shaft 25 and integrated with the sun gear S3 of the rear planetary gear unit 22, and a ring gear R2 connected to the input shaft 23 through a first clutch C1. A second clutch C2 is interposed between the input shaft 23 and the sun gear S2, and a first brake B1 which is a band brake is interposed between the sun gear S2 and the casing 24.

The rear planetary gear unlit 22 is composed of a carrier CR3 supporting a planetary pinon P3, the sun gear S3, and a ring gear R3 connected to the output shaft 25. A third brake B3 and a second one-way clutch F2 are arranged in parallel between the carrier CR3 and the casing 24. Incidentally, reference numeral 43 designates an input RPM sensor, and reference characters SP1 and SP2 designate vehicle speed sensors.

The oil pressure unit for controlling the automatic transmission 10 described above is equipped, as will be specified hereinafter, with three shifting solenoid valves SL1, SL2 and SL3, which are turned ON/OFF, as shown in FIG. 3, to engage/disengage the individual clutches C0, C1 and C2 and brakes B0, B1, B2 and B3 thereby to set the individual gear stages at individual ranges D, S and L.

At the first speed in the D-range and the S-range, the first solenoid valve SL1 is turned ON. As a result, the third clutch C0 and the first clutch C1 are engaged, but the third one-way clutch F0 and the second one-way clutch F2 are locked whereas the remaining frictional engagement means are disengaged. Thus, the overdrive planetary gear unit 20 is directly connected in its entirety through the third clutch CO and the third one-way clutch F1 so that the revolution of the input shaft 17 is transmitted as it is to the input shaft 23 of the main shift unit 19. In this main shift unit 19, on the other hand, the torque is transmitted from the input shaft 23 through the first clutch C1 to the ring gear R2 of the front planetary gear unit 21. This torque is transmitted from the ring gear R2 on one hand through the carrier CR2 to the output shaft 25 and on the other through the sun gears S2 and S3 to the carrier CR3 of the rear planetary gear unit 22. Since, however, the second one-way clutch F2 is locked to block the revolution of the carrier CR3, the planetary pinion P3 revolves on its axis so that the power is transmitted to the output shaft 25 through the ring gear R3.

At the second speed in the D-range, on the other hand, not only the first solenoid valve SL1 but also the second solenoid valve SL2 are turned ON. Then, the third clutch C0, the first clutch C1 and the second brake B2 are engaged, and the third one-way clutch F0 and the first one-way clutch F1 are locked whereas the remaining frictional engagement means are disengaged. As a result, the overdrive planetary gear unit 20 is held in its directly-connected state so that the torque is transmitted as it is from the input shaft 17 to the input shaft 23 of the main shift unit 19. In this main shift unit 19, moreover, the torque is transmitted from the input shaft 23 through the first clutch C1 to the ring gear R2 of the front planetary gear unit 21 so that the sun gear S2 receives the torque through the planetary pinion P2. However, the sun gear S2 is blocked against revolution, because the second brake B2 is engaged whereas the first one-way clutch F1 is locked. As a result, the carrier CR2 rotates while revolving the planetary pinion P2 on its axis so that the torque of the second speed is transmitted to the output shaft 25 through only the front planetary gear unit 21.

At the third speed in the D-range and the S-range, on the other hand, the first solenoid valve SL1 is turned OFF. As a result, the third clutch C0, the first clutch C1, the second clutch C2 and the second brake B2 are engaged, and the third one-way clutch F0 is locked whereas the remaining frictional engagement means are disengaged. Thus, the overdrive planetary gear unit 20 is in its directly connected state. In the main shift unit 19, on the other hand, the front planetary gear unit 21 is integrated by the engagement between the first clutch C1 and the second clutch C2 so that the torque of the input shaft 23 is transmitted as it is to the output shaft 25.

In the fourth speed, i.e., in the highest speed in the D-range, the second solenoid valve SL2 is also turned OFF so that the first clutch C1, the second clutch C2, the second brake B2 and the fourth brake B0 are engaged. The planetary shift unit 19 is in its directly connected state as at the third speed, but the overdrive planetary gear unit 20 is switched to have its third clutch CO disengaged and its fourth brake B0 engaged. As a result, the sun gear S1 is locked by the engagement of the fourth brake B0, and the planetary pinon P1 revolves on its axis to transmit the power to the ring gear R1 while allowing the carrier CR2 to revolve. Thus, the input shaft 23 of the directly connected main shift unit 19 is revolved at an accelerated speed by the input shaft 17.

At the downshift of 4-3 speeds, on the other hand, the third clutch CO is engaged, but the fourth brake B0 is disengaged. The second clutch C2 is disengaged at the shift of 3-2 speeds, and the second brake B2 is disengaged at the shift of 2-1 speeds.

The actions of the first and third speed in the S-range are similar to the aforementioned ones of the D-range. At the second speed, on the other hand, not only the first clutch C1, the third clutch CO and the second brake B2 but also the third solenoid valve SL3 is turned ON to engage the first brake B1 thereby to lock the sun gear S2 of the main shift unit 19. As a result, the engine braking is effected.

The actions of the second speed in the L-range are similar to the aforementioned ones of the second speed in the S-range. At the first speed, on the other hand, the third solenoid valve SL3 is turned ON in addition to the first clutch C1 and the third clutch CO to engage the third brake B3 thereby to lock the carrier CR3 of the rear planetary gear unit 22. Thus, the engine braking is effected.

Moreover, the third and fourth speeds in the manual shift mode are set as in the aforementioned automatic shift mode. The second speed is set like the second speed in the S-range, and the first speed is set like the first speed in the L-range.

Figure 4:
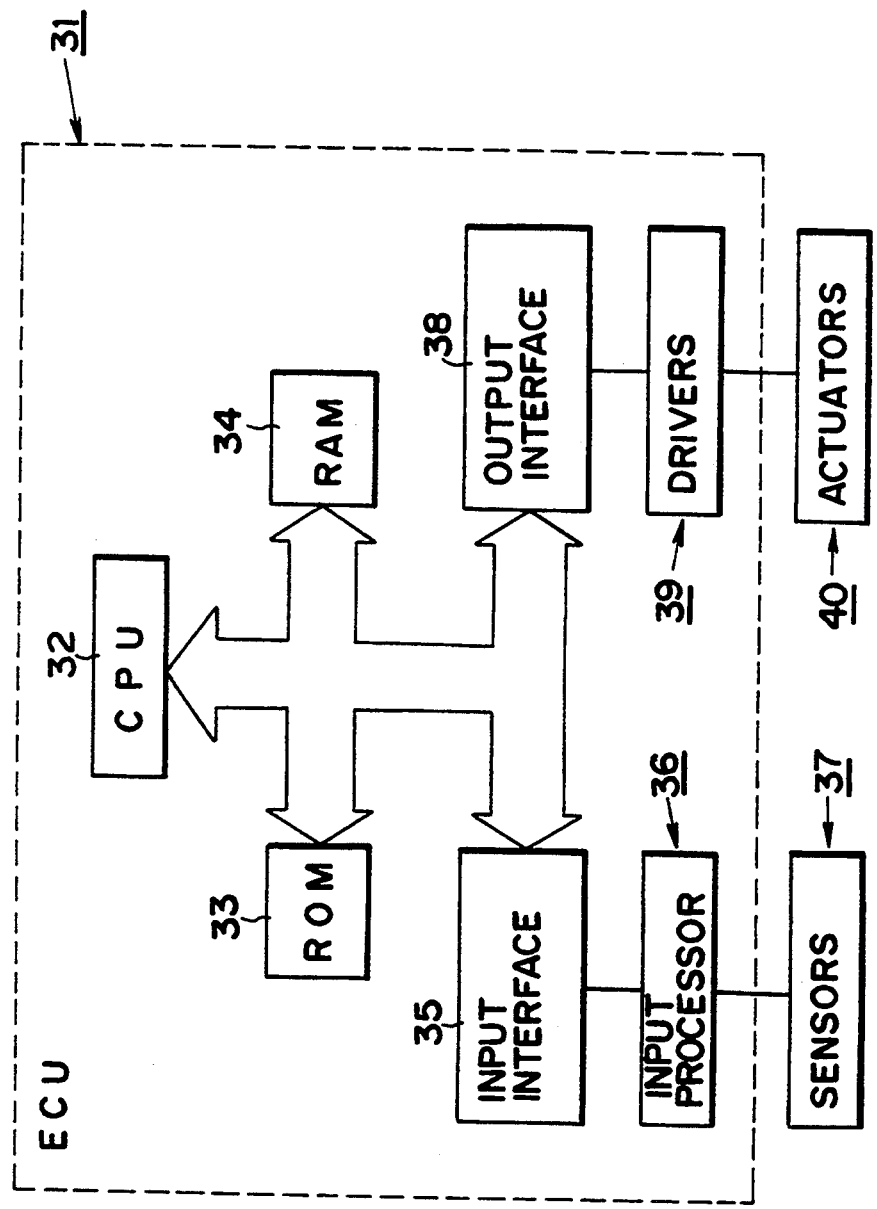
FIG. 4 is a block diagram schematically showing an electronic control unit for an automatic transmission.
Figure 5:
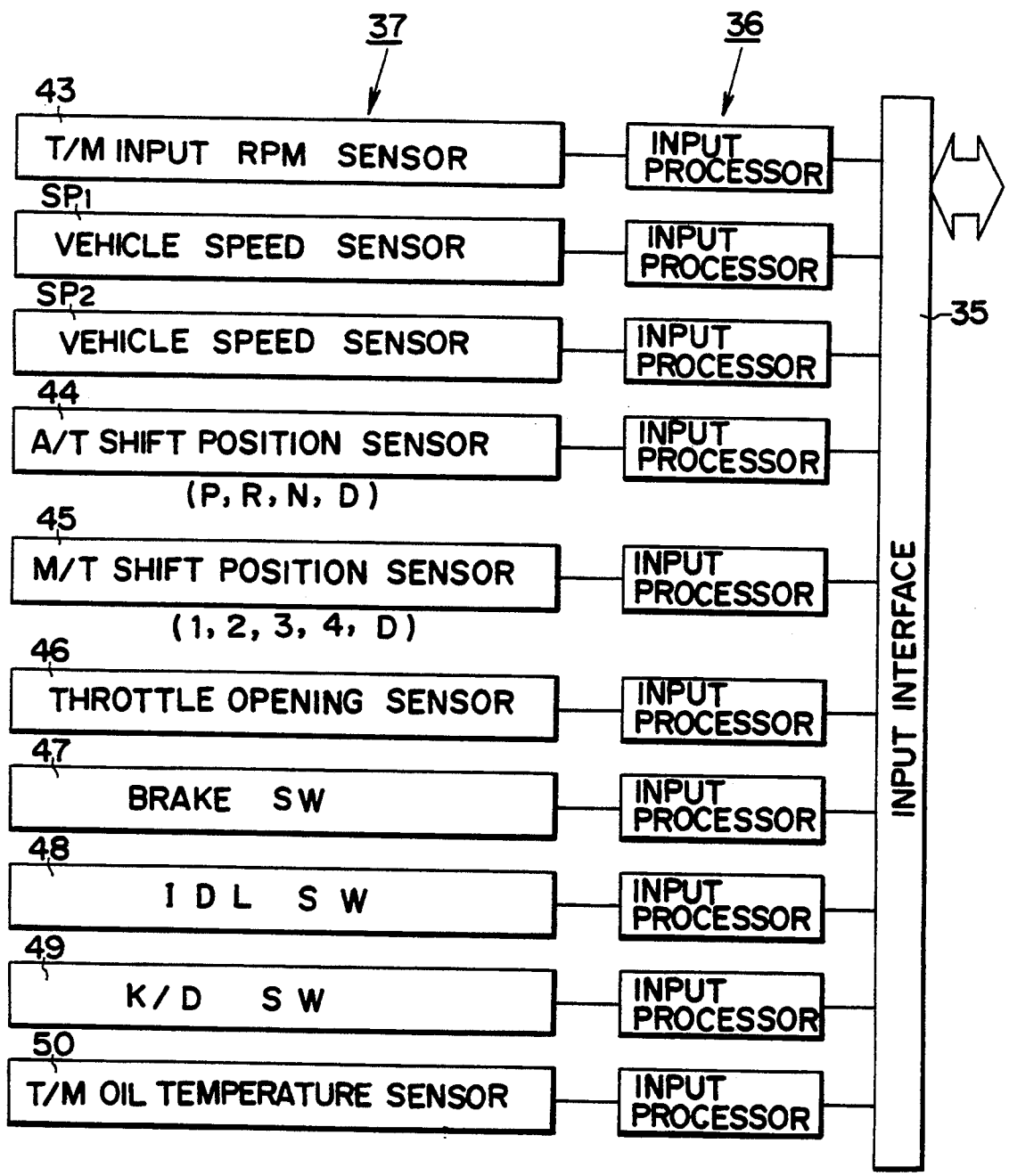
FIG. 5 is a block diagram showing the sensors which are connected with the input of the electronic control unit for the automatic transmission.
Figure 6:
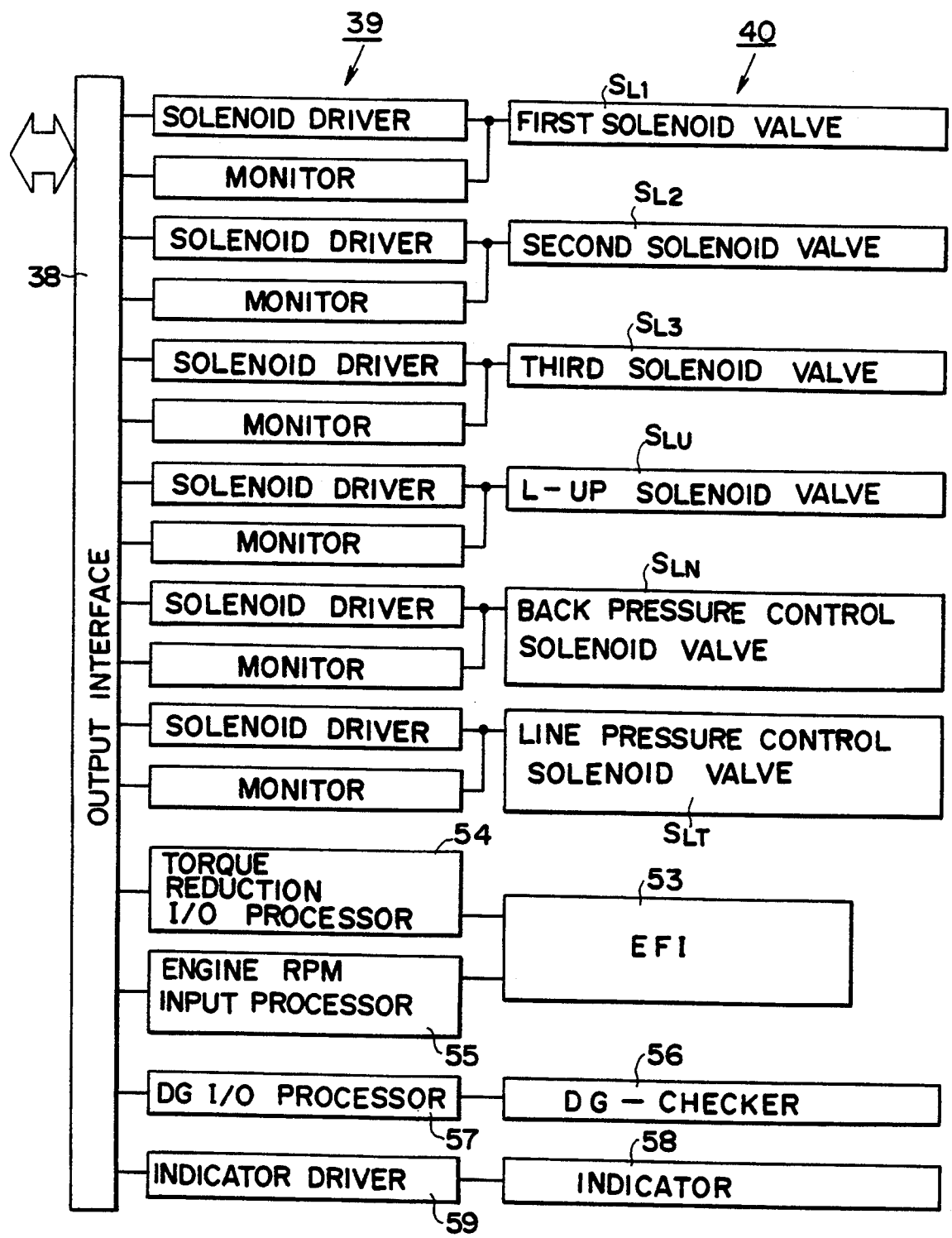
FIG. 6 is a block diagram showing the devices to be controlled, which are connected with the output of the electronic control unit for the automatic transmission.

Here will be described the shift control system in an automatic transmission according to the present invention. FIG. 4 is a schematic diagram showing the shift control system, FIG. 5 is a block diagram of the input side of the shift control system whereas FIG. 6 is a block diagram of the output side of the same.

In these Figures: reference numeral 31 designates an electronic control unit (ECU) for controlling the automatic transmission as a whole; numeral 32 designates a CPU; numeral 33 designates a ROM; numeral 34 designates a RAM; numeral 35 designates an input interface circuit; numeral 36 designates input processors connected with the input interface circuit 35 for processing various signals; and numeral 37 designates sensors connected with the input processors 36 for outputting various signals. Moreover, numeral 38 designates an output interface circuit; numeral 39 designates drivers connected with the output interface circuit 38 for outputting various signals; and numeral 40 designates an actuator connected with the drivers 39 and adapted to be driven by the output signals of the drivers 39.

The numeral 43 designates the input RPM sensor for detecting the RPM of the third clutch CO of the automatic transmission 10. The characters SP1 and SP2 designate the vehicle speed sensors for detecting the RPM of the output shaft 25 of the automatic transmission 10. The vehicle speed sensor SP1 is used either for backing up the vehicle speed sensor SP2, if the latter is troubled, or for a speed meter.

Numeral 44 designates a shift position sensor which is disposed in the automatic transmission 10 for detecting which range position on an I pattern is selected in the automatic shift mode (A/T) by the shift lever. Numeral 45 designates a shift position sensor which is disposed in the shift lever portion for detecting what shift position on an H pattern is selected in the manual shift mode (M/T) by the shift lever.

Moreover, numeral 46 designates a throttle opening sensor which is disposed in the engine for detecting a throttle opening corresponding to an load on the engine by means of a potentiometer. Numeral 47 designates a brake switch which is disposed in a brake pedal portion for detecting the braking operation. Numeral 48 designates an idling (IDL) switch which is attached to the throttle opening sensor 46 for detecting that the throttle valve is fully closed. Numeral 49 designates a kickdown (K/D) switch which is attached to the accelerator pedal portion or the throttle opening sensor for detecting that the accelerator pedal is fully depressed to require a kickdown. Numeral 50 designates an oil pressure sensor which is disposed in the automatic transmission 10 for detecting the oil temperature of the automatic transmission 10.

Incidentally, these individual sensors 37 are connected with their corresponding input processors 36.

On the other hand, the reference characters SL1, SL2 and SL3 designate the first, second and third shifting solenoid valves, respectively, which are turned ON/OFF according to the individual gear stages to switch the individual shift valves. Reference letters SLU designate a lock-up (L-up) linear solenoid valve. Letters SLN designate a linear solenoid valve for controlling the back pressure of accumulators. Letters SLT designate a linear solenoid valve for controlling the line pressure. Between tile individual solenoid valves SL1 to SL3, SLU, SLN and SLT and the output interface circuit 38, there are connected the solenoid valve drivers and the monitor circuits. The solenoid drivers generate voltages or currents for driving the individual solenoid valves SL1 to SL3 and the linear solenoid valves SLU, SLN and SLT. The monitor circuits check the operations of the solenoid valves SL1 to SL3 and the linear solenoid valves SLU, SLN and SLT to decide failures for self-diagnoses.

Numeral 53 designates an engine control unit (EFI) for controlling the engine. Numeral 54 designates a torque reduction I/O processor for outputting a signal for reducing the torque, which is generated by the engine, temporarily for damping the shift shock at a shifting time. In response to the signal from the torque reduction I/O processor 54, the engine control unit 53 performs a control for delaying the ignition timing angularly or for cutting the fuel. Numeral 55 designates an engine RPM input processor for inputting the RPM of the engine.

Numeral 56 designates a DG-CHECKER for outputting a self-diagnostic result at the failure of the automatic transmission 10 or the engine control unit 53 by an O/D OFF indicator lamp. Numeral 57 designates a DG I/O processor for outputting the self-diagnostic result of the DG-CHECKER 56. Numeral 58 designates an indicator such as a mode select lamp for indicating the state of the automatic transmission 10 or an O/D OFF indicator lamp. Numeral 59 designates a indicator driver for driving the indicator 58.

Here will be described the operations of the aforementioned control system.

Figure 7:
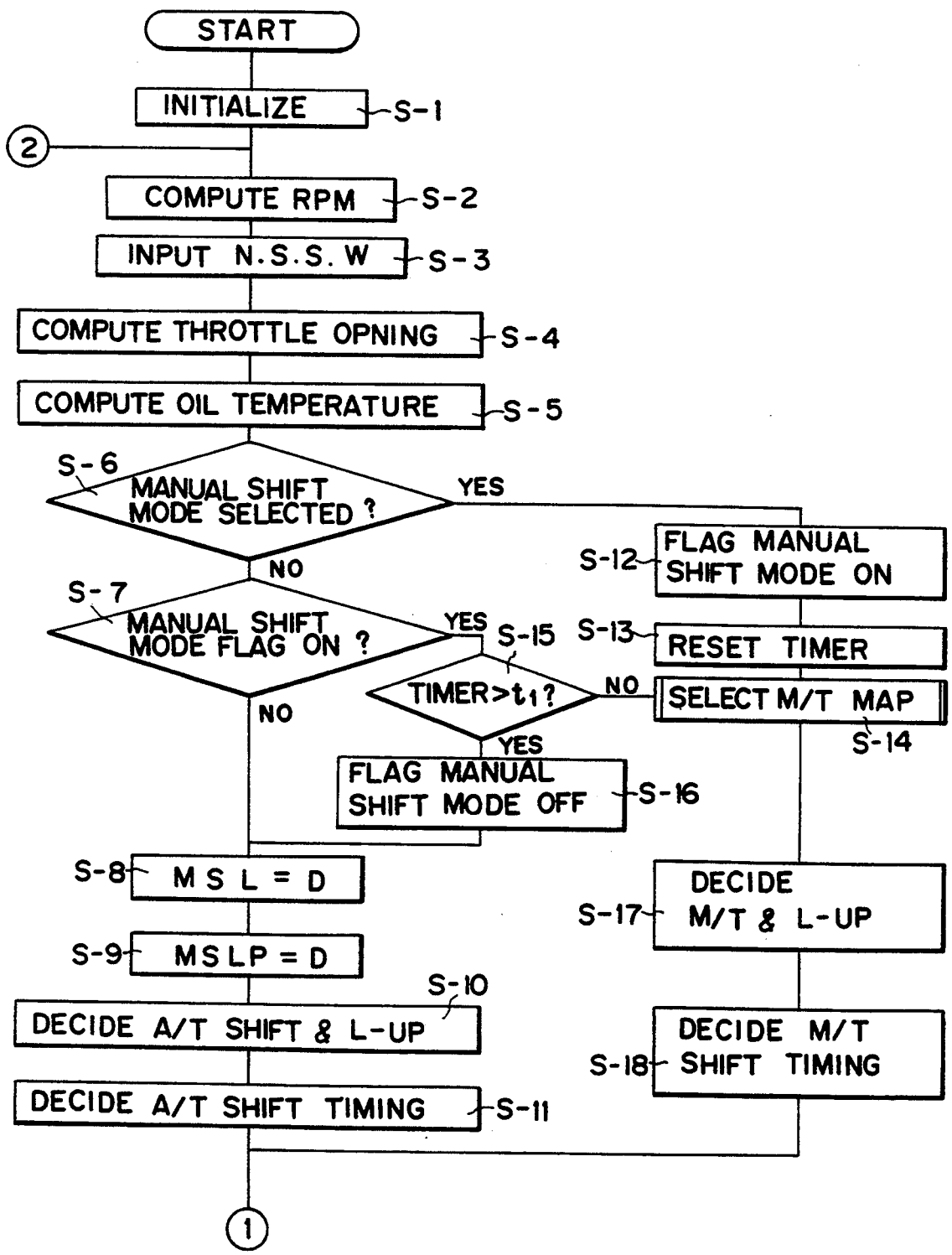
FIG. 7 shows a portion of a general flow chart for shifting an automatic transmission according to the present invention in the automatic shift mode and in the manual shift mode.
Figure 8:
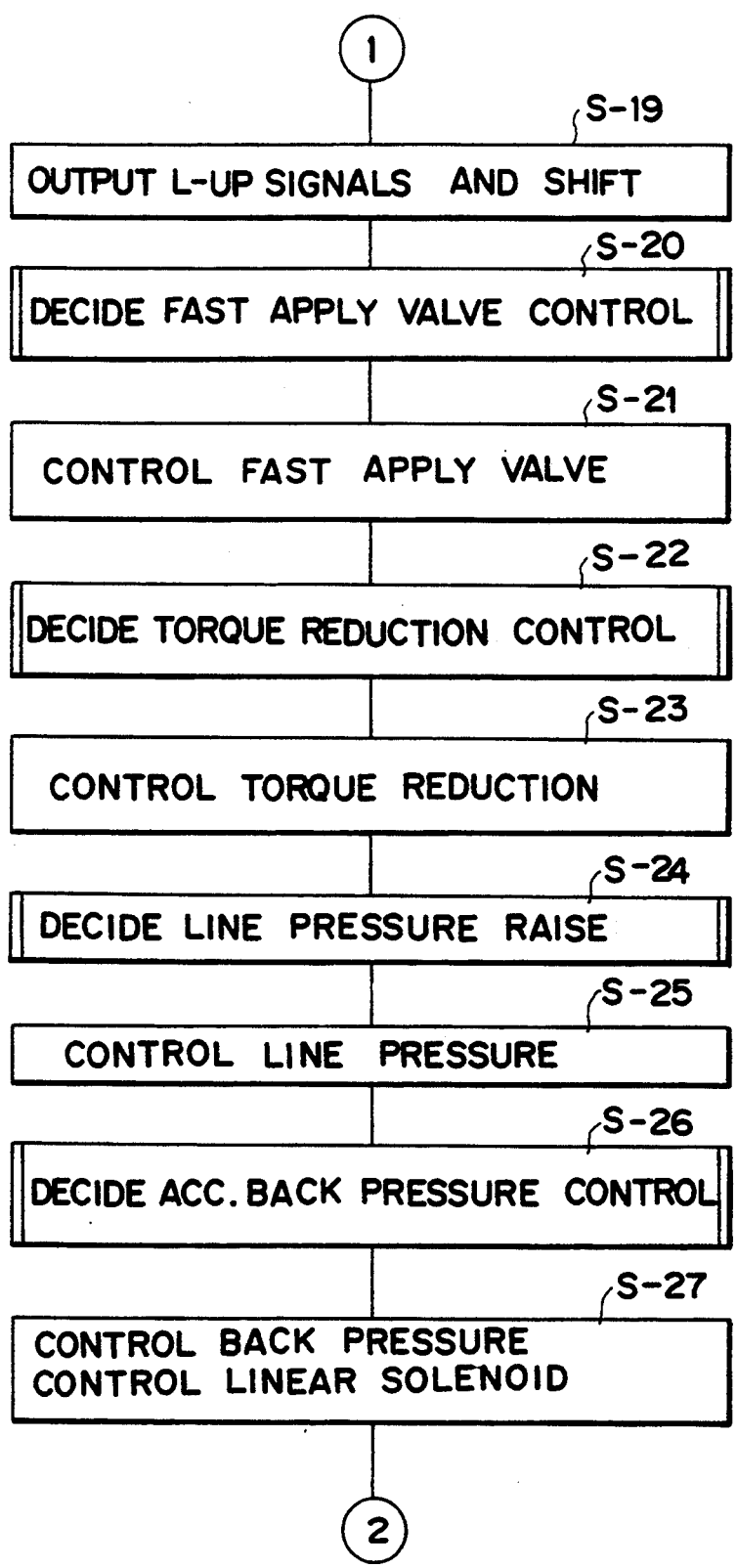
FIG. 8 shows another portion of the general flow chart.
Figure 9:
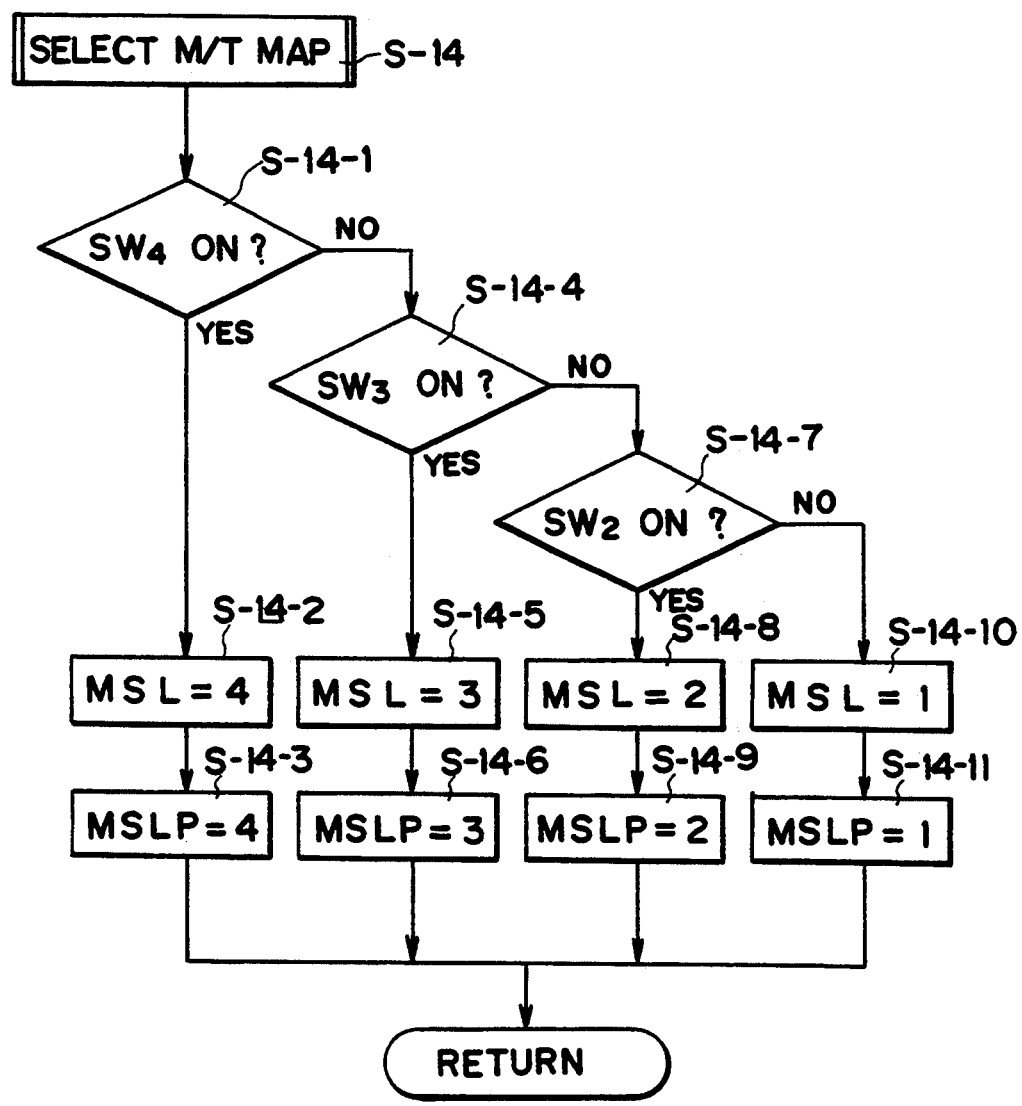
FIG. 9 is a flow chart showing a subroutine for selecting a shifting map in the manual shift mode.

FIG. 7 shows a portion of a flow chart for controlling the shift timing in the automatic shift mode and the manual shift mode, and FIG. 8 shows another portion of the flow chart. FIG. 9 is a flow chart showing a routine for controlling the data selection in accordance with the individual gear stages in the manual shift mode. Moreover, FIG. 10 is a shift pattern diagram showing the shape of grooves for guiding the shift lever in the automatic shift mode and the manual shift mode.

Figure 10:
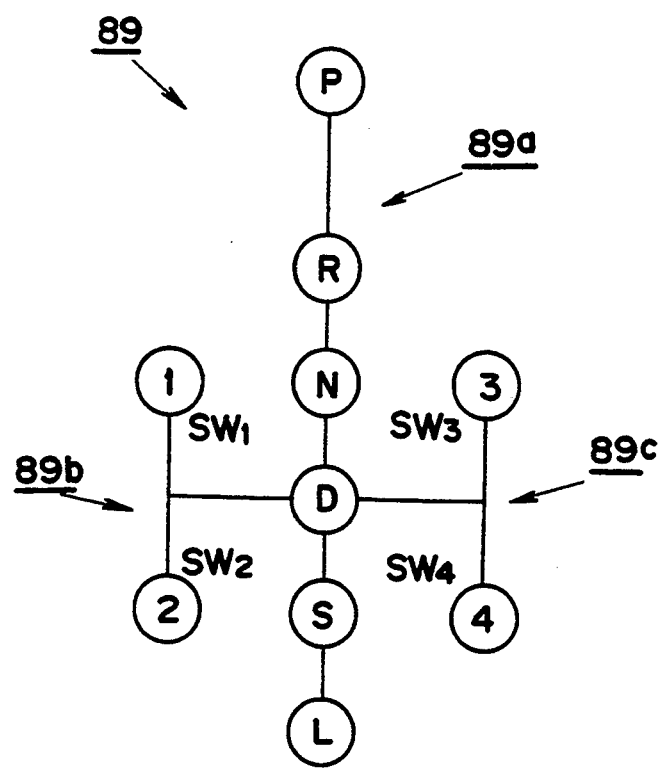
FIG. 10 is a diagram showing a shift pattern of a shift lever in the automatic shift mode and in the manual shift mode.

In FIG. 10, reference numeral 89 designates a shift pattern for providing moving paths of the shift lever. Numeral 89a designates the I pattern; numeral 89b designates a lower speed shift pattern which forms part of the H pattern and arrayed at the lefthand side of the I pattern; and numeral 89c designates a higher speed shift pattern which forms part of the H pattern and arrayed at the righthand side of the I pattern.

Reference characters SW1 to SW4 designate switches which are arranged in the shift positions corresponding to the individual gear stages of the first to fourth speeds of the shift position sensor 45. These switches SW1 to SW4 are turned ON, when the shift lever is moved to the corresponding shift positions, and OFF when the same is moved away from the shift positions.

Here will be described the individual control steps.

Step S-1: Upon starting the program, all the conditions are initialized.

Step S-2: The present RPMs of the input shaft 17 and output shaft 25 of the automatic transmission 10 are computed from the signals coming from the input RPM sensor 43 and the vehicle speed sensors SP1 and SP2 of the automatic transmission 10.

Step S-3: The range position selected at present in the I pattern is detected from the signal of the position sensor 44 of the automatic transmission 10. Simultaneously with this, the failures of N.S.S.W. are decided.

Step S-4: The present throttle opening is computed from the signal coming from the throttle opening sensor 46.

Step S-5: The present oil temperature (ATF temperature) of the automatic transmission 10 is computed from the signal coming from the oil temperature sensor 50.

Step S-6: It is decided whether the shift position sensor 45 is ON. If the answer is ON, the routine advances to Step S-12. If NO, the routine advances to Step S-7.

Step S-7: It is decided whether the manual shift mode flag is ON. The routine advances to Step S-15 if ON and to Step S-8 if OFF.

Step S-8: Automatic shifting data D are read in automatic shifting point data MSL of a shift diagram.

Step S-9: The automatic shifting data D are read in automatic shifting lockup data MSLP.

Step S-10: The shift and the lockup are decided on the basis of the shifting data read at Steps S-8 and S-9 and the various running conditions computed before.

Step S-11: The timing of the shift and lockup decisions of Step S-10 are decided.

Step S-12: If the shift position sensor 45 is ON at Step S-6, the manual shift mode flag is turned ON to invite the state of the manual shift mode.

Step S-13: The value of an automatic shift mode returning timer is reset.

Step S-14: The map for the manual shift mode is selected, and various data are read to process the manual shift map selection.

Step S-15: If the manual shift mode flag is ON at Step S-7, the value of an automatic shift mode returning timer is compared with a set value $t_1$. The routine advances to Step S-14, if the value is smaller than the set value $t_1$, and to Step S-16 if the value exceeds the set value $t_1$.

Step S-16: The manual shift mode flag is turned OFF, and the routine advances to Step S-8 to restore the automatic shift mode.

Step S-17: The shift and the lockup are decided on the basis of the data read in the manual shift map selecting subroutine and the various running conditions computed before.

Step S-18: The timings of the decisions of the shift and the lockup at the Step S-17 are decided.

Step S-19: The shift output signals are outputted to the individual solenoid valves SL1 to SL3 and linear solenoid valves SLU, SLN and SLT in accordance with the decisions of the Steps S-10, S-11, S-17 and S-18, and the shift is started.

Step S-20: A fast apply valve (or orifice control valve) is controlled at a shift transition in the manual shift mode to decide whether the time lag is to be shortened.

Step S-21: The linear solenoid valve SLU for the lockup control is controlled according to the decision in the subroutine of Step S-20.

Step S-22: It is decided whether the torque reduction control for suppressing a shift shock is necessary.

Step S-23: The torque reduction is controlled according to the decision in the subroutine of Step S-22.

Step S-24: It is decided whether the time lag is to be shortened by raising the line pressure temporarily at a shift transition in the manual shift mode.

Step S-25: The linear solenoid valve SLT for the line pressure control is controlled according to the decision in the subroutine of Step S-24.

Step S-26: It is decided whether the control of the back pressure of the accumulator is necessary for preventing the shift shock at a shift transition.

Step S-27: The linear solenoid valve SLN for controlling the accumulator back pressure is controlled according to the decision in the subroutine of Step S-26.

With reference to FIG. 9, here will be described the manual shift map selecting subroutine to be executed at Step S-14 in the aforementioned control routine.

Step S-14-1: It is decided whether the switch SW4 for the fourth speed position is turned ON in the shift position sensor 45.

Step S-14-2: If it is decided at Step S-14-1 that the fourth speed position switch SW4 is ON, the data for the fourth speed gear stage are read in the manual shifting shift point data MSL.

Step S-14-3: The fourth speed gear stage data are read in the manual shifting lockup point data MSLP.

Steps S-14-4 to 6: The data for the third speed gear stage are read as at Steps S-14-1 to S-14-3.

Steps S-14-7 to 9: The data for the second speed gear stage are read as at Steps S-14-1 to S-14-3.

Steps S-14-10 and 11: The data for the first speed gear stage are read in the manual shifting shift point data MSL and the manual shifting lockup point data MSLP.

The oil pressure circuit for executing the controls described above will be described with reference to FIGS. 11 and 12.

Figure 11:
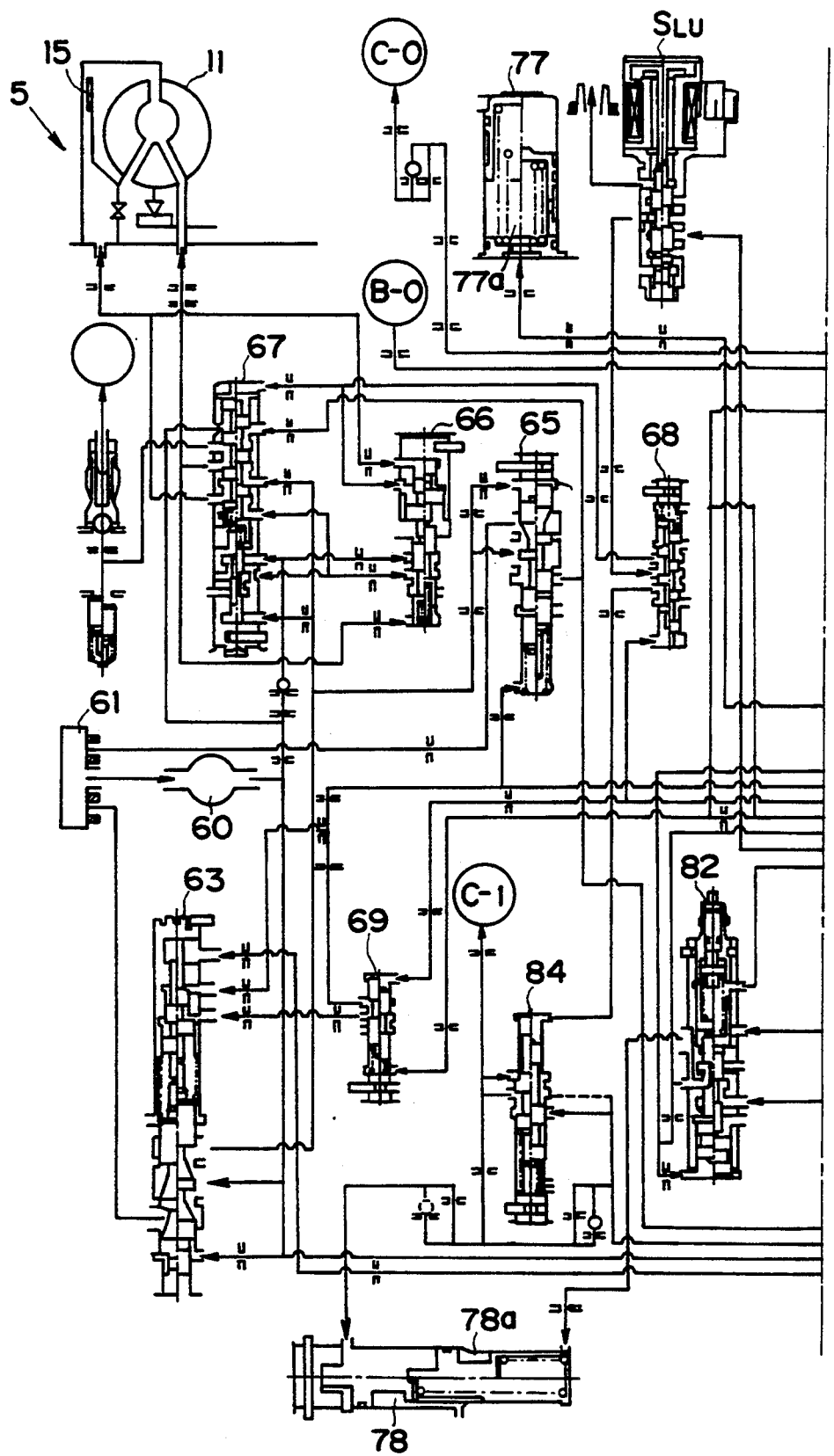
FIG. 11 shows one portion of an oil pressure circuit.
Figure 12:
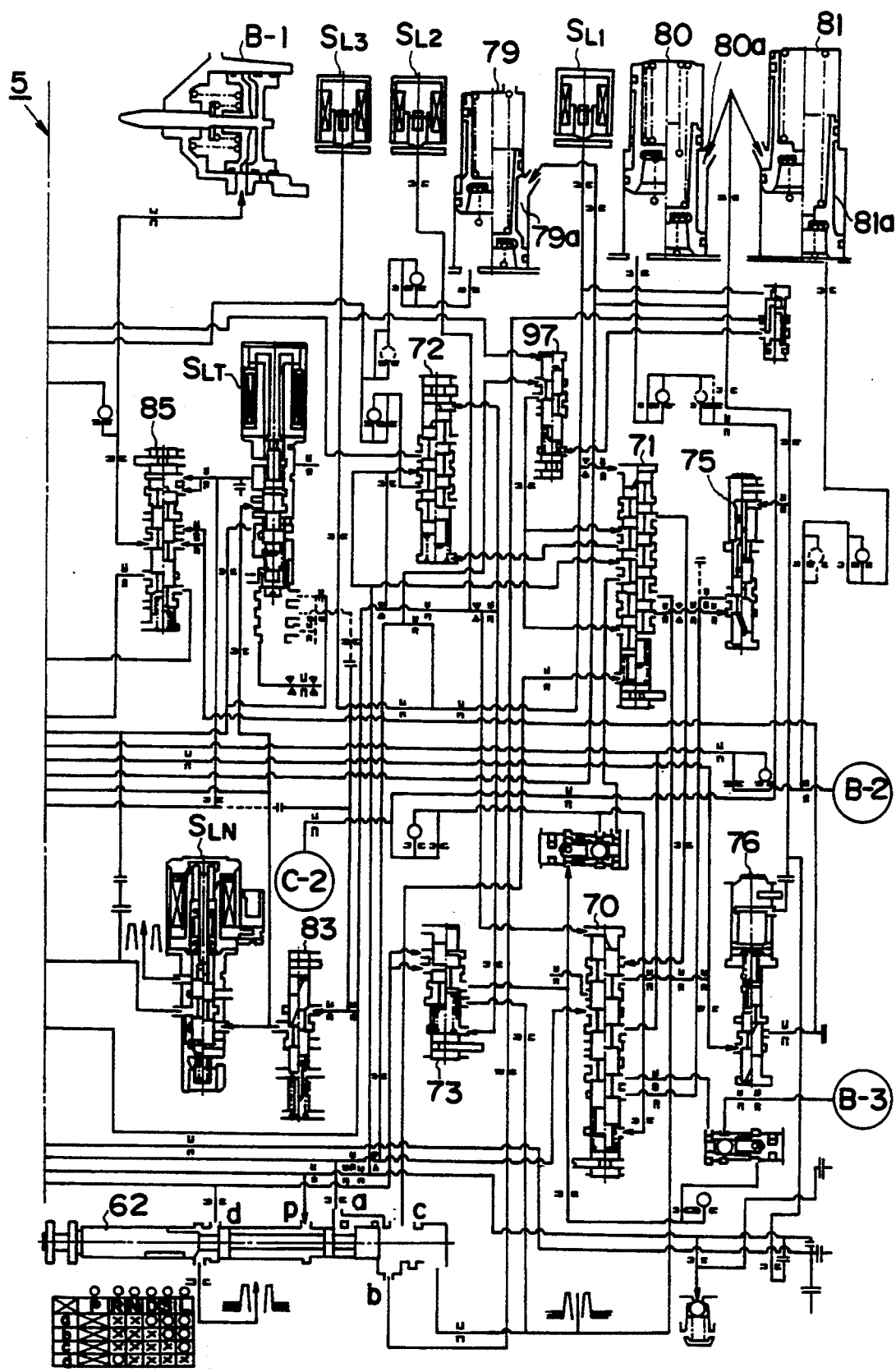
FIG. 12 shows the other portion of the oil pressure circuit.

FIG. 11 is a diagram showing one portion of the oil pressure circuit, and FIG. 12 is a diagram showing the other portion of the oil pressure circuit.

In these Figures: characters C-0 designate a hydraulic servo mechanism for the third clutch C0; characters C-1 designate a hydraulic servo mechanism for the first clutch C1; characters C-2 designate a hydraulic servo mechanism for the second clutch C2; characters B-0 designate a hydraulic servo mechanism for the fourth brake B0; characters B-1 designate a hydraulic servo mechanism for the first brake B1; characters B-2 designate a hydraulic servo mechanism for the second brake B2; and characters B-3 designate a hydraulic servo mechanism for the third brake B3. On the other hand, the reference numeral 11 designates the torque converter. Numeral 60 designates a hydraulic pump, and numeral 61 designates a strainer.

Numeral 62 designates a manual valve which is switched by manipulating the shift lever when the driver makes a shift. The manual valve is connected to the shift lever of the driver's seat through a push-pull cable and is switched to the individual positions P, R, N, D, S and L in accordance with the motion of the shift lever to establish the communication of a line pressure port p with individual ports a, b, c and d, as indicated by circles in the Table of FIG. 12.

On the other hand, numeral 63 designates a primary regulator valve for regulating the line pressure to a throttle modulator pressure and a line pressure in the R-range. The oil having its pressure regulated by the valve 63 is fed to a lockup relay valve 67 and a secondary regulator valve 65.

This secondary regulator valve 65 regulates the oil pressure of the aforementioned primary regulator valve 63 to a lubricating oil pressure and feeds the oil pressure to the lockup relay valve 67.

Numeral 66 designates a lockup control valve for regulating the oil pressure to be fed to the control oil pressure chamber at the leading end of the lockup relay valve 67. This lockup relay valve 67 is actuated by the signal oil pressure coming from the third solenoid valve SL3 and a solenoid relay valve 68 to engage/disengage the lockup clutch 15 of the torque converter 11.

Numeral 69 designates a cut-back valve which regulates the signal pressure of the linear solenoid valve SLT to a cut-back pressure in accordance with the oil pressure of the first brake B1, the oil pressure of the second brake B2 and the elastic force of a spring, to feed the regulated signal pressure to the primary regulator valve 63 thereby to regulate the line pressure.

Numeral 70 designates a 1-2 shift valve for switching the first speed and the second speed. This 1-2 shift valve 70 is fed at its control oil pressure chamber of its leading end with the oil pressure of the second solenoid valve SL2 so that it takes a position located in the righthand half at the first speed and a position located in the lefthand half at the second and third speeds. At the first speed, specifically, the 1-2 shift valve 70 is in righthand half to stop the feed of the oil pressure to the hydraulic servo mechanism B-1 and the hydraulic servo mechanism B-2 and effects the feed of the oil pressure to the hydraulic servo mechanism B-3 in the L-range. At the second speed, the 1-2 shift valve 70 takes the lefthand half so that the oil pressure from the manual valve 62 is fed to the hydraulic servo mechanism B-2. In the S-range and the L-range, on the other hand, the 1-2 shift valve 70 receives the oil pressure from a later-described 2-3 shift valve 71 and feeds it to the hydraulic servo mechanism B-1 through a second coast modulator valve 76.

The numeral 71 designates the 2-3 shift valve for switching the second speed and the third speed. This 2-3 shift valve 71 is fed at its control oil pressure chamber of its leading end with the oil pressure of the first solenoid valve SL1 so that it takes a position located in the righthand half at the first speed and at the second speed and a position located in the lefthand half at the third speed and at the fourth speed. Specifically, the feed of the oil pressure to the hydraulic servo mechanism C-2, which has been stopped at the first speed and at the second speed, is restored at the third speed.

The numeral 72 designates the 3-4 shift valve for switching the third speed and the fourth speed. This 3-4 shift valve 72 is fed at its control oil pressure chamber of its leading end with the oil pressure of the second solenoid valve SL2 so that it takes a position located in the righthand half at the first speed, at the second speed and at the third speed and a position located in the lefthand half at the fourth speed. Specifically, the oil pressure, which has been fed to the hydraulic servo mechanism C-0 at the first speed, at the second speed and at the third speed, is stopped at the fourth speed because the 3-4 shift valve 72 is in the lefthand half. On the contrary, the feed of the oil pressure to the hydraulic servo mechanism B-0, which has been stopped at the first speed, at the second speed and at the third speed, is restored at the fourth speed.

Numeral 73 designates a reverse inhibit valve which is actuated, when the second solenoid valve SL2 is opened at a vehicle speed of 9 Km/h or more, to stop the feed of the oil pressure to the hydraulic servo mechanism C-2.

Numeral 75 designates a low coast modulator valve. The numeral 76 designates the second coast modulator valve which is actuated when the engine braking is to be effected.

The clutches C0, C1 and C2 and brakes B0 and B2 described above are individually equipped with accumulators. Specifically: numeral 77 designates an accumulator for the third clutch C0; numeral 78 designates an accumulator for the first clutch C1; numeral 79 designates an accumulator for the fourth brake B0; numeral 80 designates an accumulator for the second clutch C2; and numeral 81 designates an accumulator for the second brake B2. There is provided an accumulator control valve 82 for modulating the oil pressure to be fed to the back pressure chambers 77a, 78a, 79a, 80a and 81a of those accumulators 77, 78, 79, 80 and 81 and for controlling the low coast modulator valve 75 and the second coast modulator valve 76. Numeral 97 designates a coast brake cut-off valve.

The first solenoid valve SL1 and the second solenoid valve SL2 switch and control the aforementioned 1-2 shift valve 70, 2-3 shift valve 71 and 3-4 shift valve 72. The third solenoid valve SL3 switches and controls the coast brake cut-off valve 97. On the other hand, the linear solenoid valves SLU, SLN and SLT are fed with the oil pressure which is modulated by a solenoid modulator valve 83. Moreover, numeral 84 designates an orifice control valve, and numeral 85 designates a cut-off valve.

Incidentally, symbols used in FIGS. 11 and 12 are identical to those used in the oil pressure circuit for the automatic transmission in the prior art. Thus, those portions of the construction of FIGS. 11 and 12, which are left undescribed, will be easily understood from those symbols.

Incidentally, the automatic transmission having the construction described above is enabled to achieve a gear stage corresponding to a shift position by the driver's manipulating the shift lever so that it can provide a shifting feel. Since, however, the gear train and the oil pressure circuit 5 for executing a shift by the gear train are basically identical to those of the prior art, they are constructed to prevent a frequent shift and to elongate the time period from the manipulation of the shift lever by the driver to the start of the actual shift. This retards the response to the manual shift so that the shifting feel is deteriorated.

In case of running in the manual shift mode, therefore, shift start timing means is provided to shorten the time period from the manipulation of the shift lever to the start of the actual shift.

In the first embodiment of the present invention, therefore, in case of a shift in the manual shift mode, the line pressure at the shifting transition is raised for the time period from the shift output to the start of an inertia phase, so that the time lag of the shift is shortened to make the shifting feel stronger than that of the case in which the shift is carried out in the automatic shift mode. Specifically, the time period for the individual clutches C0, C1 and C2 and brakes B0, B1, B2 and B3 to engage can be shortened by raising the line pressure to be fed to the hydraulic servo mechanisms C-0, C-1, C-2, B-0, B-1, B-2 and B-3.

The start of the inertia phase for an upshift is decided in the following manner. The RPM of the third clutch C0 detected by the input RPM sensor 43 is designated at NC0; the RPM of the output shaft 25 detected by the vehicle speed sensors SP1 and SP2 is designated at N0; and the gear ratio of the gear stage before the shift is designated at $\gamma 1$. Then, the value NT1 given by the following formula is compared with the aforementioned RPM NC0:

$$NT1=(N0 \times \gamma 1)-\alpha \text{ ($\alpha$: a constant)}.$$

It is decided that the inertia phase is started, if the following relation holds:

$$NC0 < NT1.$$

In another case for deciding the start of an inertia phase for a downshift, the value NT2 given by the following formula is compared with the aforementioned RPM NC0 if the gear ratio of a shifted gear stage is designated at $\gamma 2$:

$$NT2 = N0 \times \gamma 2.$$

The inertia phase is decided if the following relation holds:

$$NC0 > NT2 - N2$$

(N2: data set for the kind of shifts).

In this case, the line pressure is raised by feeding the signal oil pressure outputted from the linear solenoid valve SLT to the primary regulator valve 63.

Figure 13:
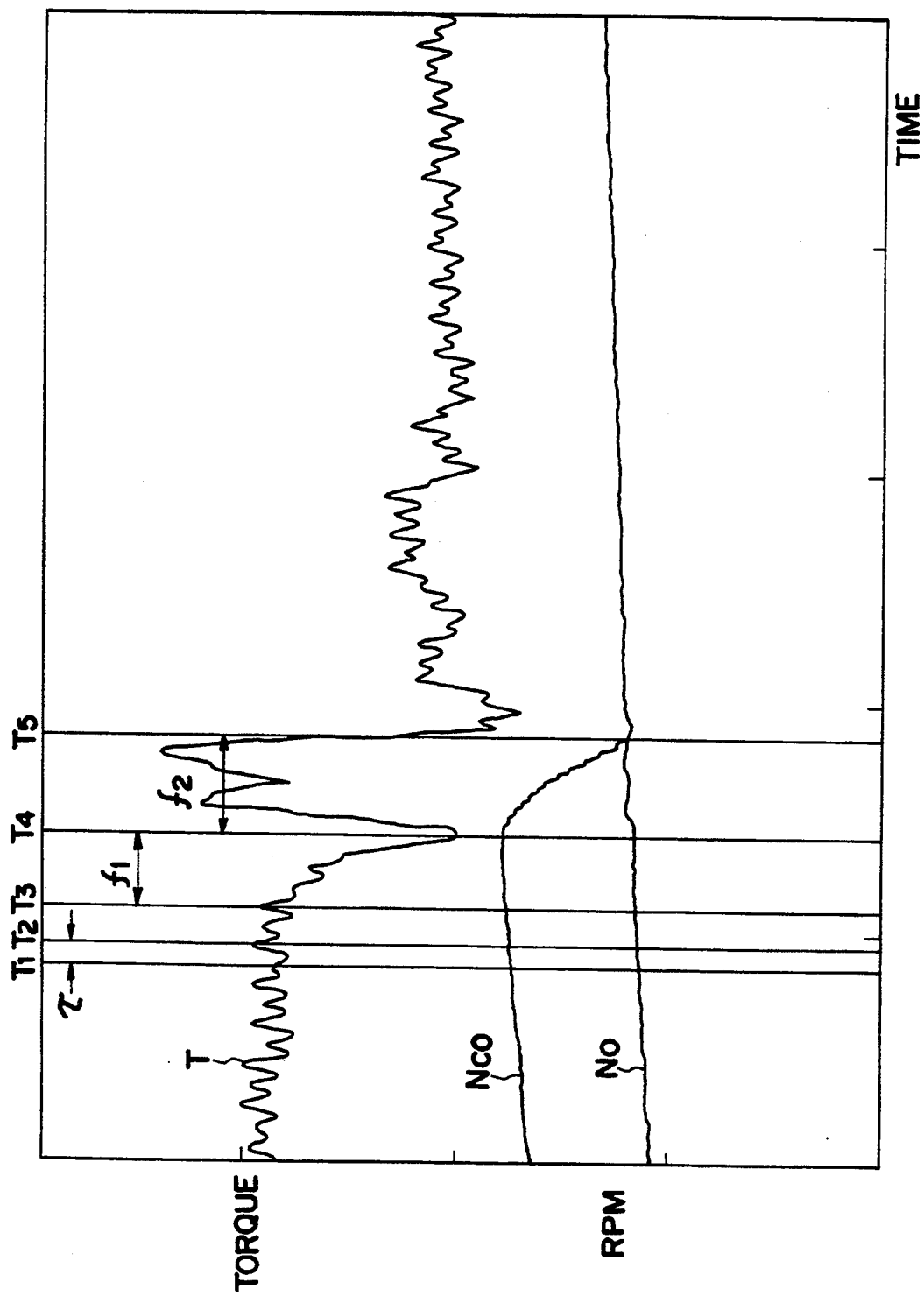
FIG. 13 is a time chart plotting changes in the output torque, the RPM of an output shaft and the RPM of an input shaft during transition of a shift.
Figure 14:
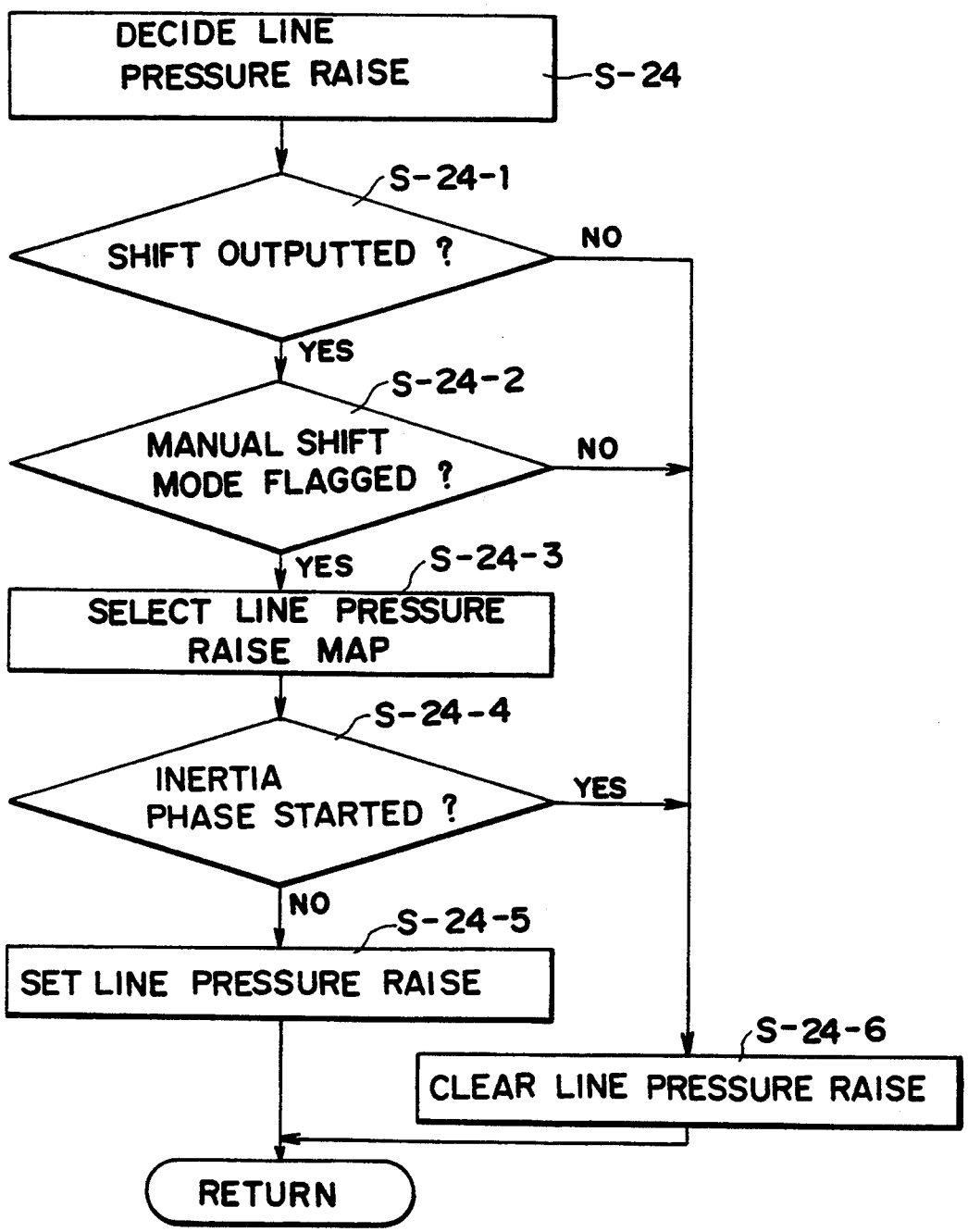
FIG. 14 is a flow chart showing a subroutine for controlling the raise of a line pressure.
Figure 15:
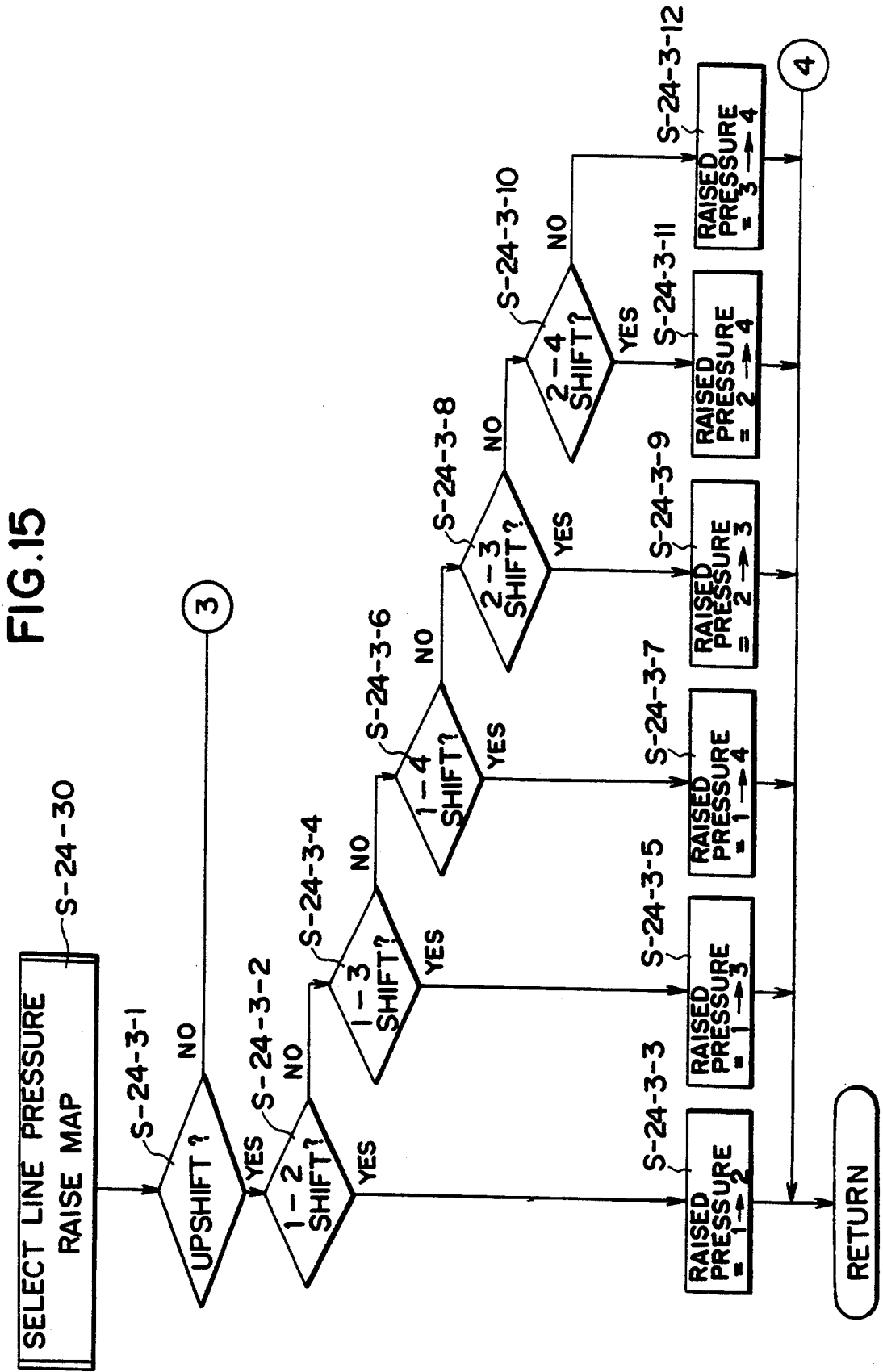
FIG. 15 is a flow chart showing a portion of a subroutine for selecting data for the line pressure raise control.
Figure 16:
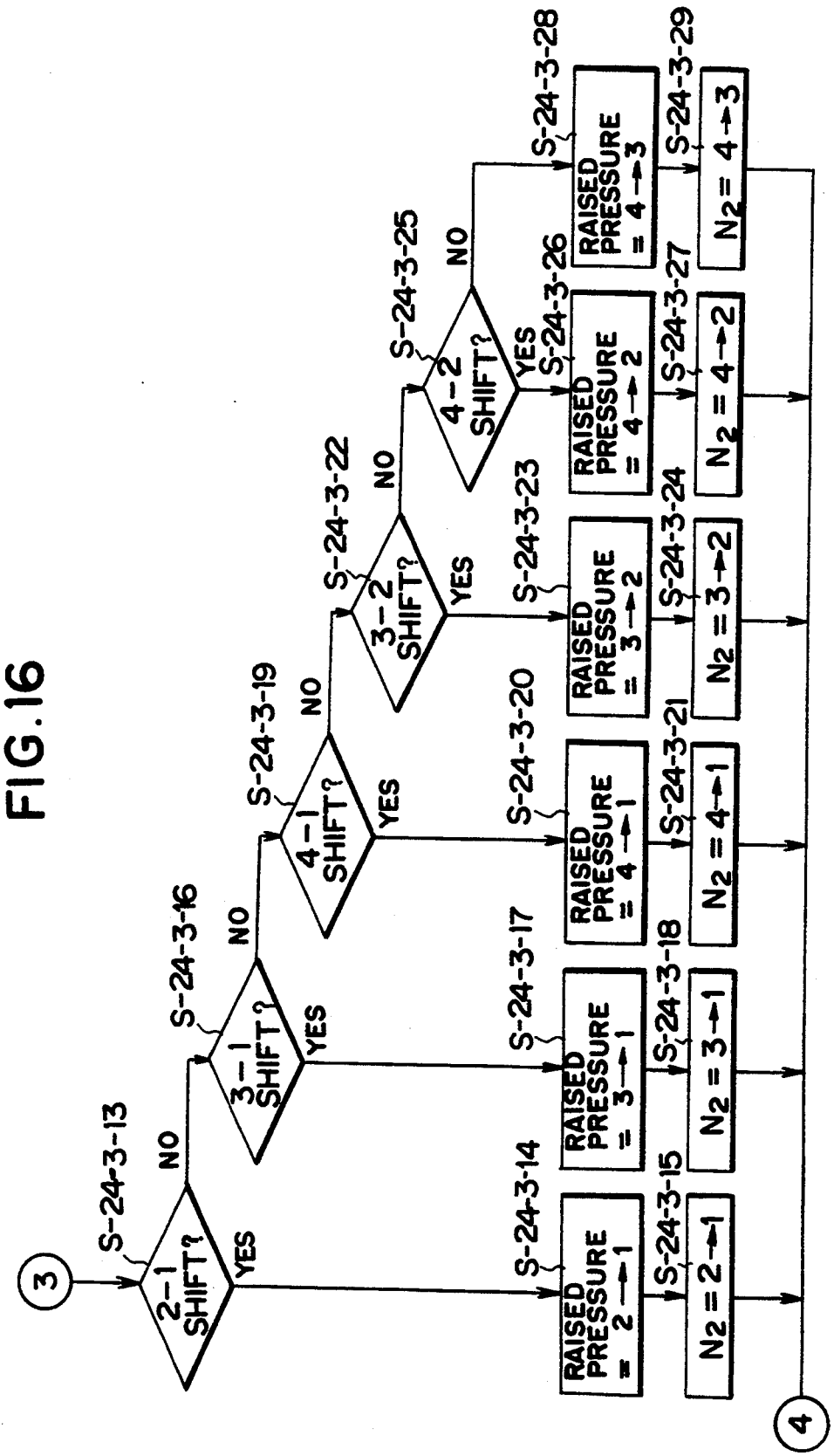
FIG. 16 is a flow chart showing another portion of the subroutine for selecting data for the line pressure raise control.

FIG. 13 is a diagram for explaining the inertia phase; FIG. 14 is a flow chart showing a subroutine for deciding that the raise control of the line pressure should be carried out; and FIGS. 15 and 16 are flow charts showing a subroutine for selecting the raised pressure values.

In FIG. 13: reference letter T designates an output torque; characters NC0 designate the RPM of the third clutch C0, which is detected by the input RPM sensor 43; characters N0 designate the RPM of the output shaft 25, which is detected by the vehicle speed sensors SP1 and SP2; characters $T_1$ designate the instant when a shift decision is carried out; characters $T_2$ designate the instant when a shift output is carried out; characters $T_3$ designate the instant when there is started the torque phase in which one of the frictional engagement means starts to slip whereas the other of the frictional engagement means is completely engaged; characters $T_4$ designate the instant when there is started the inertia phase in which both of the frictional engagement means slip so that the RPM NC0 starts to change; and characters $T_5$ designate the instant of the shift end. Moreover: letter $\tau$ designates the time period from the instant $T_1$ of the shift decision to the instant $T_2$ of the shift output; characters $f_1$ designate the time period of the torque phase; and characters $f_2$ designate the time period of the inertia phase.

Here will be described with reference to FIG. 14 the line pressure raise decision of Step S-24, which is shown in FIG. 8.

Step S-24-1: It is decided whether the shift output has been carried out. If the answer is NO, the subroutine advances to Step S-24-6 to clear the line pressure raise. If this line pressure raise is not set yet, the subroutine is returned.

Step S-24-2: If the shift output is carried out, it is decided whether the manual shift mode flag of Step S-12 of FIG. 7 is ON. The subroutine advances to Step S-24-3, if the answer is YES, but to Step S-24-6, if the answer is NO, to clear the line pressure raise.

Step S-24-3: The line pressure raise map is selected so as to raise the line pressure corresponding to the kind of each of gear stages. Step S-24-4: It is decided whether the inertia phase is started. If the answer is YES, the subroutine advances to Step S-24-6 so as to end the pressure raise thereby to clear the line pressure raise.

Step S-24-5: If the inertia phase is not started, the line pressure raise is set.

Step S-24-6: The line pressure raise is cleared.

The routine for selecting the line pressure raise map at the aforementioned Step S-24-3 is shown in FIGS. 15 and 16.

Step S-24-3-1: It is decided whether the shift is an upshift. The subroutine advances to Step S-24-3-2, if YES, but to Step S-24-3-13 if NO.

Steps S-24-3-2 and 3: If in the 1-2 shift, the raised pressure corresponding thereto is selected.

Steps S-24-3-4 and 5: If in the 1-3 shift, the raised pressure corresponding thereto is selected.

Steps S-24-3-6 and 7: If in the 1-4 shift, the raised pressure corresponding thereto is selected.

Steps S-24-3-8 and 9: If in the 2-3 shift, the raised pressure corresponding thereto is selected.

Steps S-24-3-10 and 11: If in the 2-4 shift, the raised pressure corresponding thereto is selected.

Step S-24-3-12: If in the 3-4 shift, the raised pressure corresponding thereto is selected.

Steps S-24-3-13 and 14: If in the 2-1 shift, the raised pressure corresponding thereto is selected.

Step S-24-3-15: The value of the data $N_2$ corresponding to the 2-1 shift is selected.

Steps S-24-3-16 and 17: If in the 3-1 shift, the raised pressure corresponding thereto is selected.

Step S-24-3-18: The value of the data $N_2$ corresponding to the 3-1 shift is selected.

Steps S-24-3-19 and 20: If in the 4-1 shift, the raised pressure corresponding thereto is selected.

Step S-24-3-21: The value of the data $N_2$ corresponding to the 4-1 shift is selected.

Steps S-24-3-22 and 23: If in the 3-2 shift, the raised pressure corresponding thereto is selected.

Step S-24-3-24: The value of the data $N_2$ corresponding to the 3-2 shift is selected.

Steps S-24-3-25 and 26: If in the 4-2 shift, the raised pressure corresponding thereto is selected.

Step S-24-3-27: The value of the data $N_2$ corresponding to the 4-2 shift is selected.

Step S-24-3-28: If in the 4-3 shift, the raised pressure corresponding thereto is selected.

Step S-24-3-29: The value of the data $N_2$ corresponding to the 4-3 shift is selected.

Incidentally, in order to shorten the time period in the manual shift mode from the manipulation of the shift lever to the actual start of the shift, it is essential that the frictional engagement means can start their engagement promptly. For this, it is sufficient to raise the oil pressure which is fed to the hydraulic servo mechanisms through the accumulators. Contrary to the aforementioned example, therefore, the accumulator back pressure may be temporarily raised.

Specifically, in the aforementioned oil pressure circuit 5, the accumulator back pressure is controlled by the accumulator control valve 82, the control level of which is controlled by the linear solenoid valve SLN. And, this control is carried out after the shifting operation in the manual shift mode and before the inertia phase is started. Moreover, the raised pressure values are stored in advance in the map in accordance with the kinds of shifts so that one of them may be selected in accordance with the kind of shift effected. Therefore, the control routine is expressed by a flow chart in which the "line pressure" appearing in the flow charts of FIGS. 13 to 15 is replaced by the "accumulator back pressure".

Incidentally, the accumulator acts to suppress the rise of the oil pressure while its elastic member is contracting, as well known in the art, to elongate the time period for the oil pressure to be fed to the frictional engagement means. In other words, the rate of feeding the oil pressure to the frictional engagement means is maximized if the accumulator is left inoperative. In order to start the shift promptly in the manual shift mode, therefore, the following control may be accomplished to leave the accumulator inoperative.

In case of a shift in the manual shift mode, the back pressure outputted from the aforementioned accumulator control valve 82 is raised to the maximum to leave the individual accumulators 77 to 81 inoperative. Since the capacity of the oil passages is reduced to an extent corresponding to the depths of the accumulators 77 to 81, the pressures in the hydraulic servo mechanisms C-0, C-1, C-2, B-0, B-1, B-2 and B-3 can be quickly raised to advance the start of the shift.

In this case, the aforementioned back pressure is likewise outputted from the accumulator control valve 82, the control level of which is adjusted by controlling the linear solenoid valve SLN for controlling the back pressure of the accumulators by the electronic control unit 31.

After the clutches C0, C1 and C2 and the brakes B0, B1, B2 and B3 are engaged, the back pressure is dropped to operate the individual accumulators 77 to 81 thereby to prevent a severe shifting shock.

A flow chart for this control can be exemplified by a flow chart, in which the "line pressure" of the flow chart shown in FIG. 14 is replaced by the "accumulator back pressure" and in which Step S-24-3 of the same is changed to include "Raise Accumulator Back Pressure to Maximum".

If the capacity to be fed with the oil pressure is small, as described above, the start of engaging the frictional engagement means is advanced. If the hydraulic servo mechanisms of the frictional engagement means are exemplified by the double chamber type, the start of engaging the frictional engagement means is advanced earlier if the total capacity of the chambers to be fed with the oil pressure is the smaller. The following example is intended to advance the start of engaging the frictional engagement means by reducing the number of chambers to be fed with the oil pressure.

Figure 17:
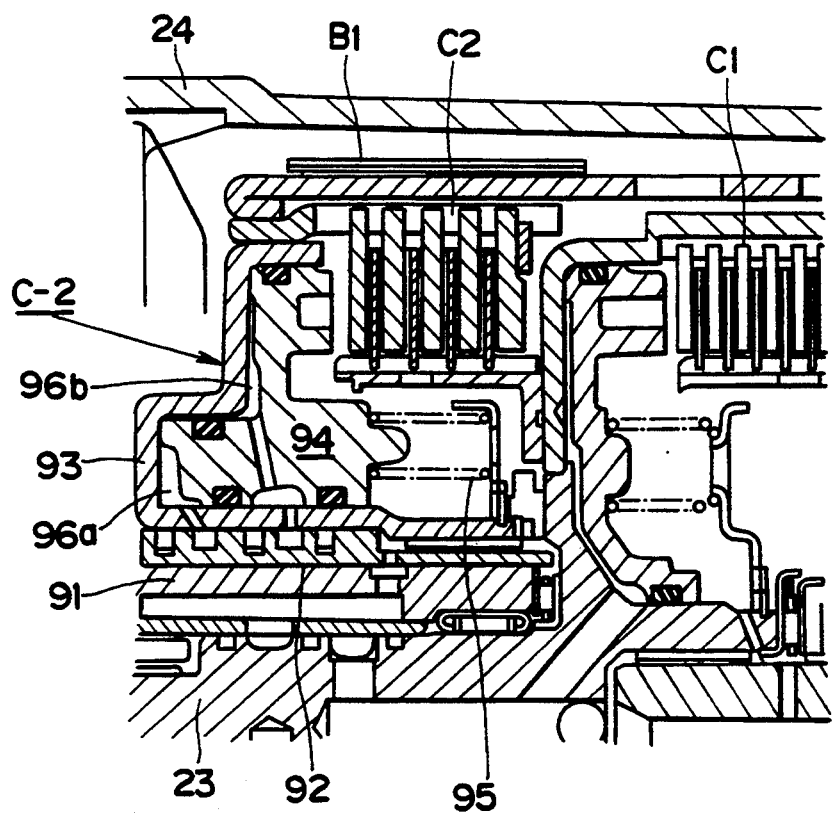
FIG. 17 is a section showing a portion of one example of a double chamber type piston.

FIG. 17 is a section showing a portion of a hydraulic servo mechanism having a double chamber piston. In FIG. 17, reference numeral 91 designates a center piece which is fitted in the casing 24 for supporting the input shaft 23 rotatably. On the outer circumference of the center piece 91, there is arranged a sleeve 92 for feeding the oil to the hydraulic servo mechanism C-2. On the outer circumference of the sleeve 92, there is rotatably arranged a hydraulic servo drum 93.

In this hydraulic servo drum 93, there is slidably fitted an annular piston 94 which is urged in one direction by a return spring 95. Between the hydraulic servo drum 93 and the annular piston 94, moreover, there are formed a first inner chamber 96a and a second outer chamber 96b.

In case the aforementioned second clutch C2 is to be engaged, for example, the first chamber 96a and the second chamber 96b are fed in the automatic shift mode with a lower oil pressure, and only the first chamber 96a is fed with a higher oil pressure in the manual shift mode.

The oil pressure is changed in accordance with the change in the chamber to be fed with the oil pressure, and this oil pressure change is effected by changing the line pressure. Specifically, the line pressure is changed by controlling the linear solenoid valve SLT to feed the signal oil pressure to the primary regulator valve 63.

Here will be described both an oil pressure circuit for switching the feed of the oil pressure between the aforementioned first and second chambers 96a and 96b and an application chart.

Figure 19:
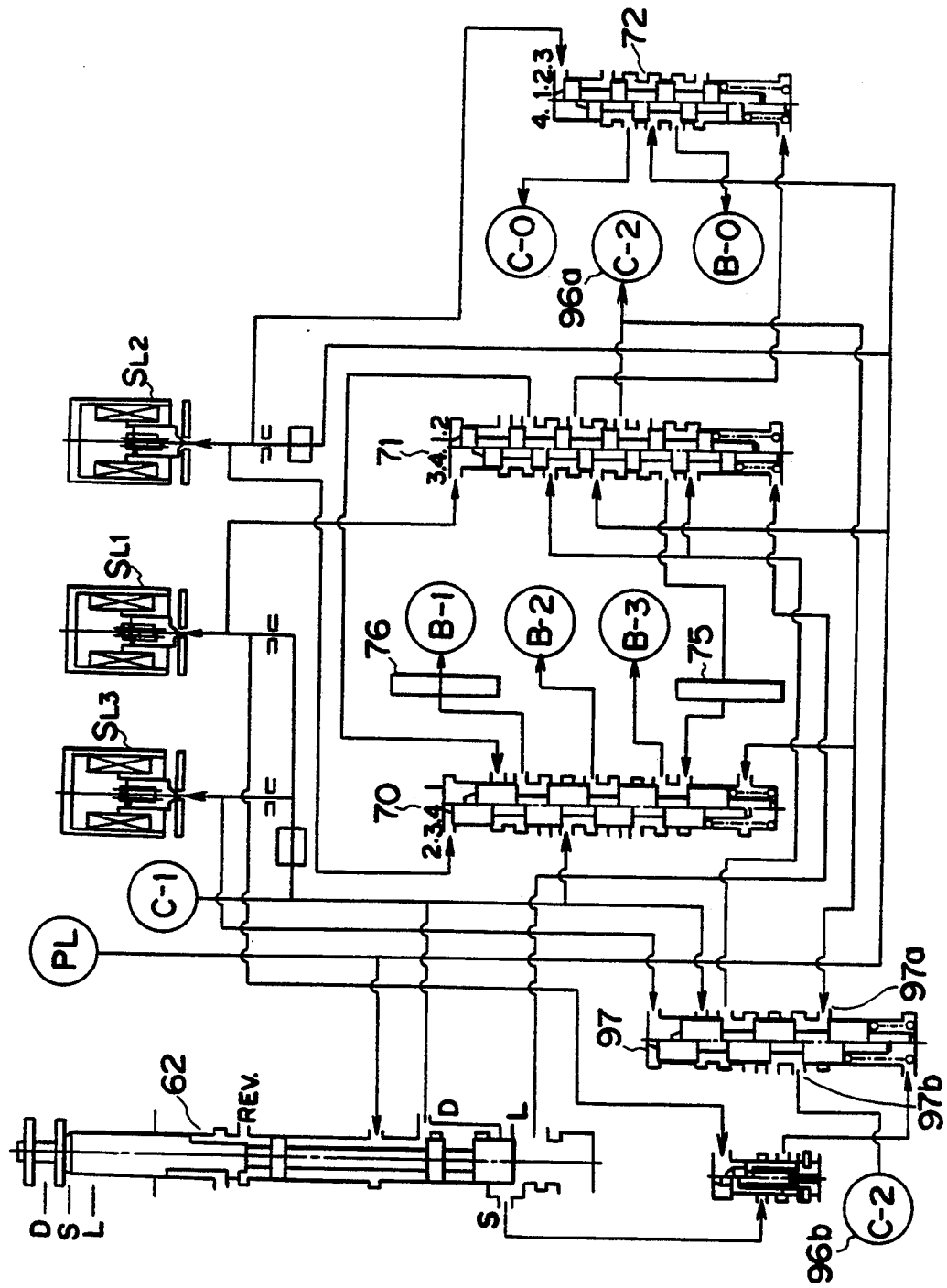
FIG. 19 is a diagram showing a portion of an oil pressure circuit centering a shift valve.

FIG. 18 is an application chart of an automatic transmission equipped with the hydraulic servo mechanism shown in FIG. 17, and FIG. 19 is a diagram showing a major portion of the oil pressure circuit for the automatic transmission.

At the third speed in the automatic shift mode, as shown in FIG. 18, the first solenoid valve SL1 and the third solenoid valve SL3 are OFF, but the second solenoid valve SL2 is ON. As a result, the hydraulic servo mechanism C-2 has its first and second chambers 96a and 96b fed with the oil pressure. At the third speed in the manual shift mode, on the other hand, the first solenoid valve SL1 is OFF, but the second solenoid valve SL2 and the third solenoid valve SL3 are ON. As a result, the hydraulic servo mechanism C-2 has its only first chamber 96a fed with the oil pressure.

In FIG. 19, reference letters PL designate a supply source for the line pressure, and the remaining characters designate the same members or portions as those of the foregoing Figures. The coast brake cut-off valve 97 takes a position, as located at a righthand half, when the third solenoid valve SL3 is turned OFF at the third speed in the automatic shift mode, but a position, as located at a lefthand half, when the third solenoid valve SL3 is turned ON at the third speed of the manual shift mode.

When the 2-3 shift valve 71 takes a position, as located at the lefthand half, at the time of the 2-3 shift, the line pressure from the supply source PL is fed to the first chamber 96a. Since, moreover, the aforementioned coast brake cut-off valve 97 takes a position, as located at the righthand half, in the automatic shift mode, its ports 97a and 97b are made to communicate to feed the oil pressure to the second chamber 97b, too. In the manual shift mode, on the other hand, the coast brake cut-off valve 97 takes a position, as located at the lefthand half, the communication between the port 97a and the port 97b is blocked to feed the oil to the first chamber 96a only.

In the description made above, only the hydraulic servo mechanism C-2 of the second clutch C2 is formed with the two chambers, but the hydraulic servo mechanisms of the other frictional engagement means may be formed with a plurality of chambers.

In order to start the shifts early in the manual shift mode, there is a method by which the time period from the shift decision to the shift output is made shorter than that in the automatic shift mode.

In the automatic shift mode, the throttle opening is changed if the driver depresses the accelerator pedal. This throttle opening is detected by the throttle opening sensor 46. Then, the shift decision is carried out on the basis of the running condition which is computed from the detected throttle opening and the RPM NO of the output shaft 25 detected by the vehicle speed sensors SP1 and SP2. After a time period $\tau$ set by the manual shift mode returning timer has elapsed, the shift output is effected to feed the signals to the individual solenoid valves SL1 to SL3. In order to prevent any frequent shift, the aforementioned time period $\tau$ is ordinarily set to a high constant value but is set to a smaller value in the manual shift mode.

If, in the manual shift mode, the driver manipulates the shift lever to select a shift position corresponding to each of the gear stages of the first to fourth speeds, one of the switches SW1 to SW4, which is arranged in the shift position, is turned on so that the shift is decided. The time period $\tau$ from the instant $T_1$ of the shift decision to the instant $T_2$ of the shift output is changed. This changing control can be carried out in the electronic control unit 31 by controlling the shift output without changing the data stored in the map nor performing the control by the timer for a while.

As has been described with reference to FIG. 14, the raise of the line pressure for improving the shifting feel in the manual shift mode is carried out after the shift output to the start of the inertia phase. However, the control of dropping the line pressure to an ordinary pressure simultaneously with the start of the inertia phase is difficult on the basis of the detected signal of the inertia phase. It is, therefore, preferable to perform the learning control or the stepwise pressure dropping control, as will be described in the following.

Figure 20:
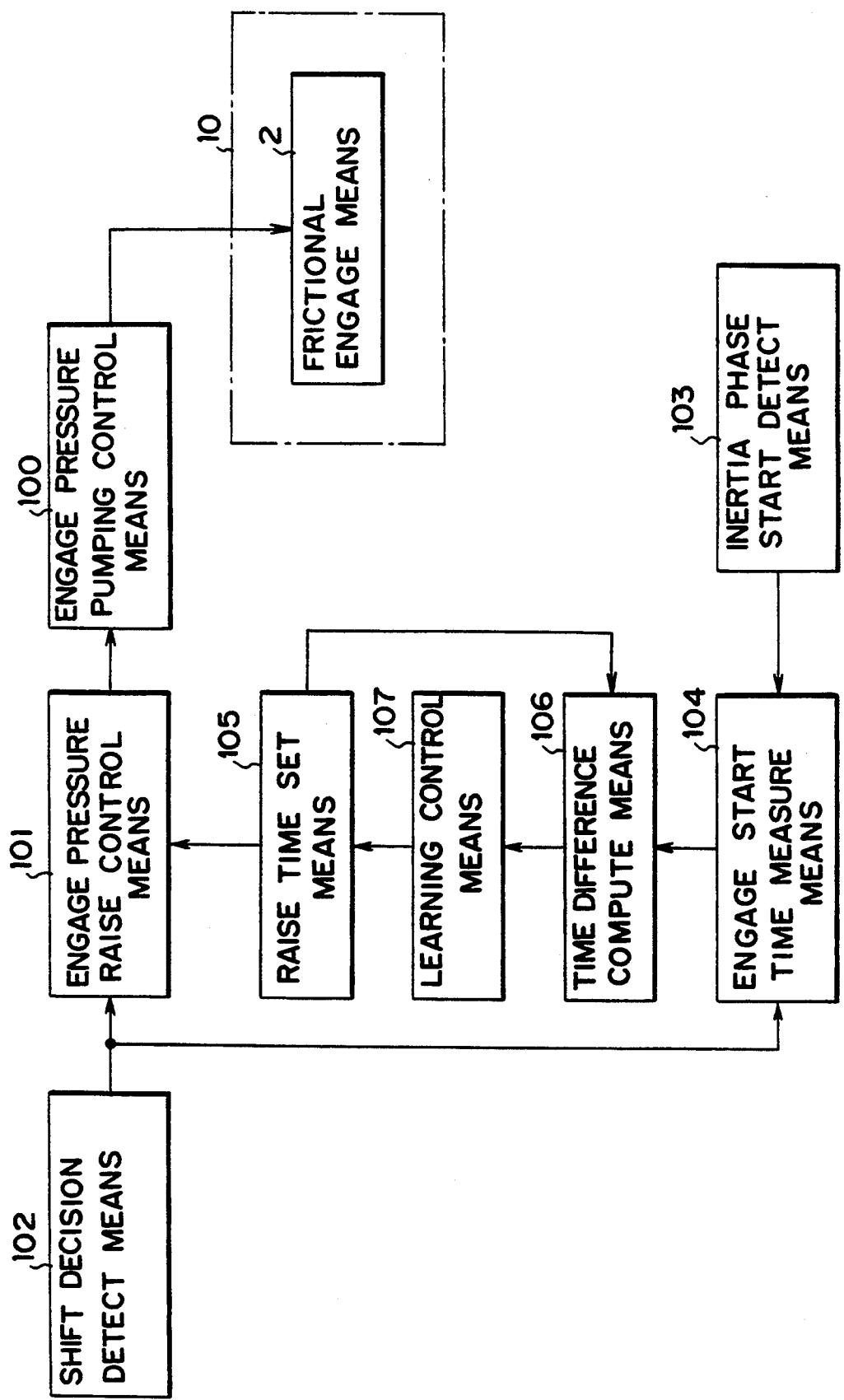
FIG. 20 is a block diagram showing a system for controlling the learning of the raising time of an engage pressure, with functional means.

FIG. 20 is a block diagram showing a system for learning and controlling the time period for raising the engagement pressure, in functional expressions. The automatic transmission 10 of FIG. 20 is equipped with the frictional engagement means 2 such as the clutches or brakes, and these frictional engagement means 2 are engaged/disengaged by the oil pressure which is fed and released by engagement pressure pumping means 100. The engaging pressure is selectively raised by engagement pressure raising means 101 and is fed or released when shift decision detecting means 102 decides a shift. The start of the inertia phase, which is caused by the engagement of the frictional engagement means taking part in the shift, is detected by inertia phase start detecting means 103. On the basis of the output signal of the inertia phase start detecting means 103 and the output signal from the aforementioned shift decision detecting means 102, engagement start time measuring means 104 measures the time period from the shift decision to the start of the inertia phase. On the other hand, the time period for the aforementioned engagement pressure raise control means 101 to hold the engagement pressure in the raised state, i.e., the pressure raise time period is set by pressure raise setting means 105. The difference of the pressure raise time period from the time period computed by the engagement start time measuring means 104 is computed by time difference computing means 106. Moreover, learning control means 107 sets a new pressure raise time period by adding or subtracting the computed time difference to and from the pressure raise time period. As a result, the pressure raise time period can be converged to the time period till the start of the inertia phase so that the engagement pressure can be set without any time difference to a higher pressure than the engagement pressure in the automatic shift mode. As a result, the responsiveness to the shift in the manual shift mode can be improved to prevent any excessive shifting shock.

Here will be specifically described an example of the system for the raise control of the engagement pressure described above in the manual shift mode.

Figure 21:
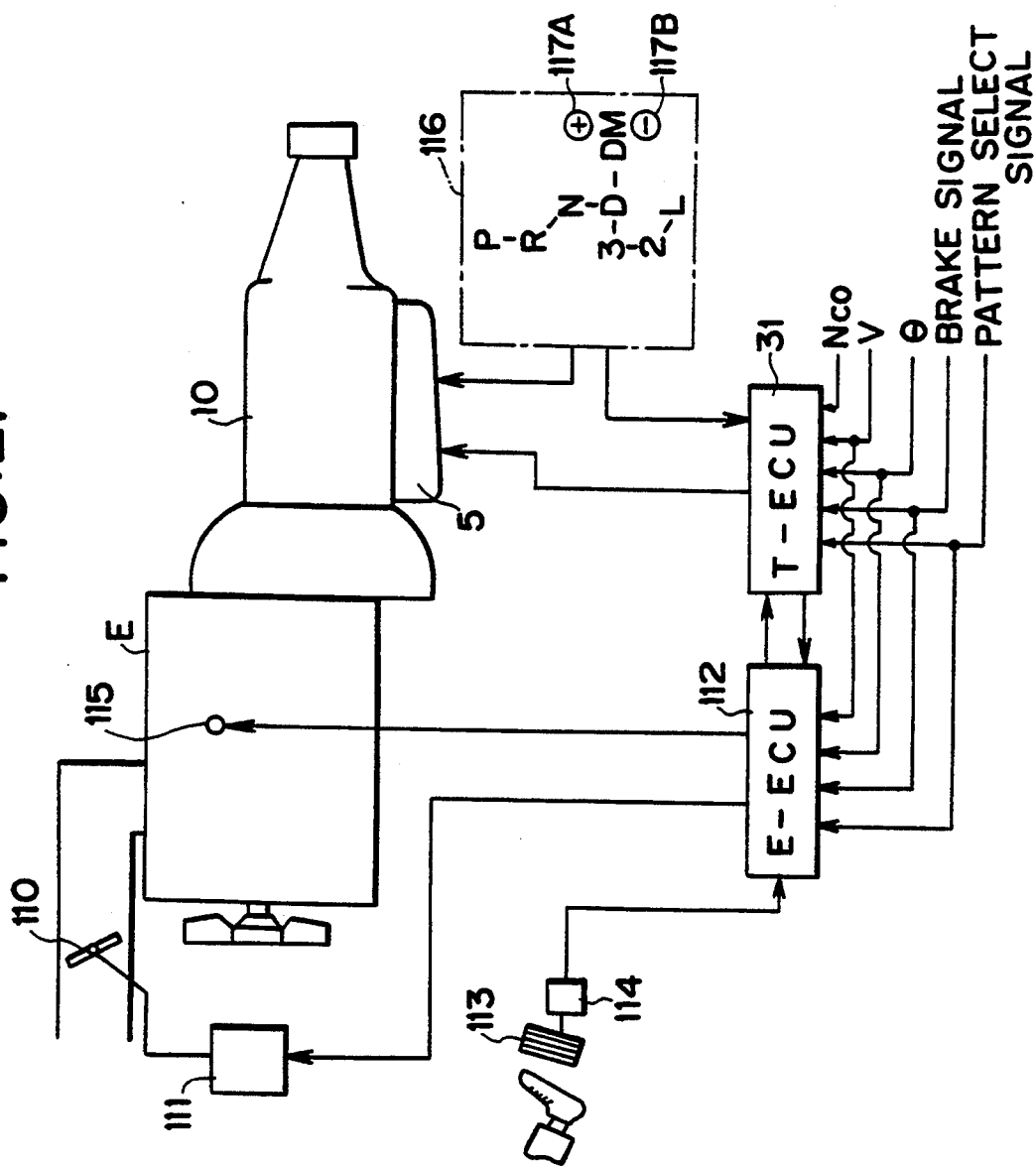
FIG. 21 is a block diagram showing the control system schematically.

To an engine E, as shown in FIG. 21, there is connected the automatic transmission 10 which is enabled to switch the automatic shift mode and the manual shift mode (DM) by means of the shift lever. The engine E has its throttle valve 110 controlled by an actuator 111 such as a motor. This actuator 111 in turn is controlled by an engine electronic control unit (E-ECU) 112.

This electronic control unit 112 is composed mainly of a central processing unit (CPU), storage units (ROM, RAM) and an input/output interface and is fed with signals including an output signal coming from a sensor 114 for detecting the depression of an accelerator pedal 113, a vehicle speed signal, a brake signal coming from a side brake switch or a foot brake switch and an engine water temperature signal. In accordance with the depression of the accelerator pedal 113, moreover, the actuator 111 is operated to set the throttle valve 110 to a predetermined opening and to control the fuel injection rate of a fuel injector 115 to a value suitable for the throttle opening.

On the other hand, the shifts in the automatic transmission 10 are executed by controlling the individual solenoid valves of the oil pressure circuit 5 by the automatic transmission starting electronic control unit (T-ECU) 31 and by actuating the manual shift valve by a shift unit 116.

This shift unit 116 is adapted, as shown in FIG. 21, to switch and select the individual ranges of a parking range (P), a reverse range (R), a neutral range (N), a drive range (D), a third range (3), a second range (2) and an L-range (L), and a range (DM) of the manual shift mode by means of the shift lever.

In case the manual shift mode is selected, an operation signal can be sent to the automatic transmission electronic control unit 31 by a later-described shift lever to set an arbitrary gear stage of the first to fourth speeds manually.

Figure 22:
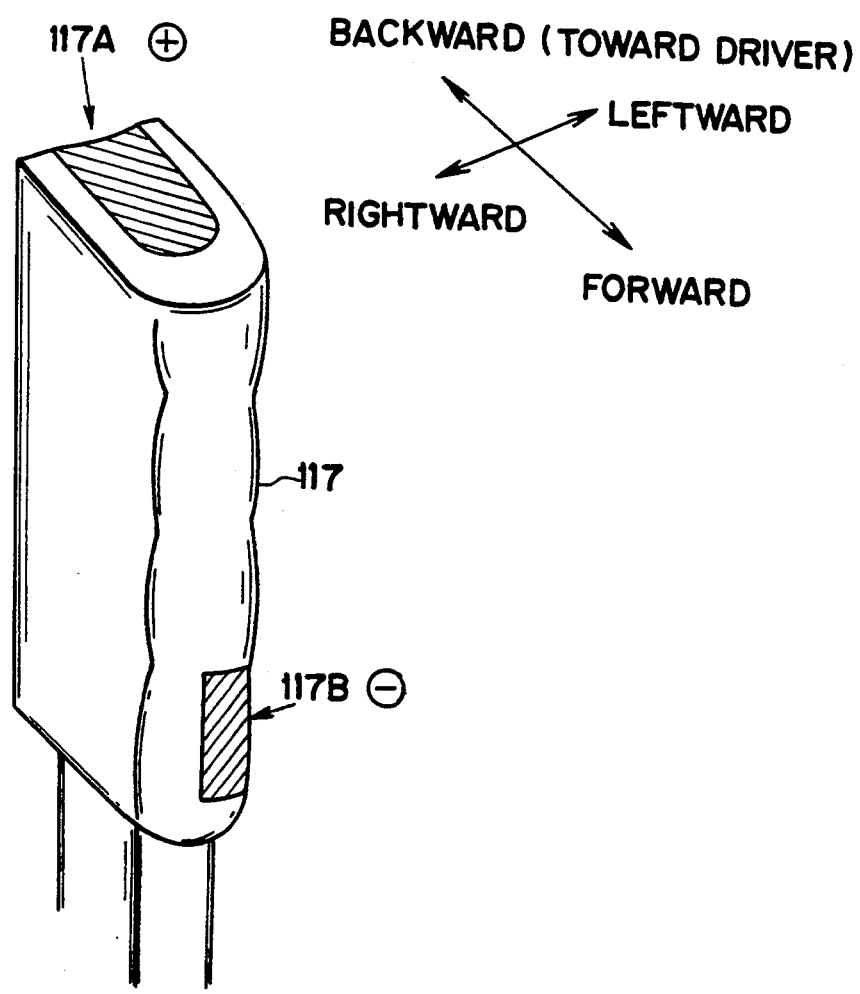
FIG. 22 is a perspective view showing a portion of a shift lever to be used in the system.

FIG. 22 shows a grip portion of a shift lever 117. This grip portion is equipped at the side of the driver with a plus (+) switch 117A for shifting up the gear stage and at its lower front portion with a minus (−) switch 117B for shifting down the gear stage. If one of those switches is pushed with the shift lever 117 being positioned in the manual shift mode, the automatic transmission 10 is shifted up or down step by step from the present gear stage. Incidentally, this operation is made effective only in the manual shift mode.

On the other hand, the automatic transmission electronic control unit 31 is fed with the signals from the aforementioned plus and minus switches 117a and 117B in addition to the ordinary signals such as the throttle opening signal or the vehicle speed signal. Moreover, the gear train belonging to the automatic transmission 10 shown in FIG. 21 is identical to the aforementioned one of FIG. 2. Still moreover, the oil pressure circuit 5 belonging to the automatic transmission 10 shown in FIG. 21 includes the aforementioned oil pressure circuit shown in FIG. 19. Incidentally, in case the start of engaging the frictional engagement means is advanced in the manual shift mode by raising the line pressure, the system can be practiced by using single chamber frictional engagement means. Thus, the coast brake cut-off valve 97 shown in FIG. 19 can be exemplified by a valve which is equipped with a spool having two lands but not the aforementioned ports 97a and 97b.

Figure 23:
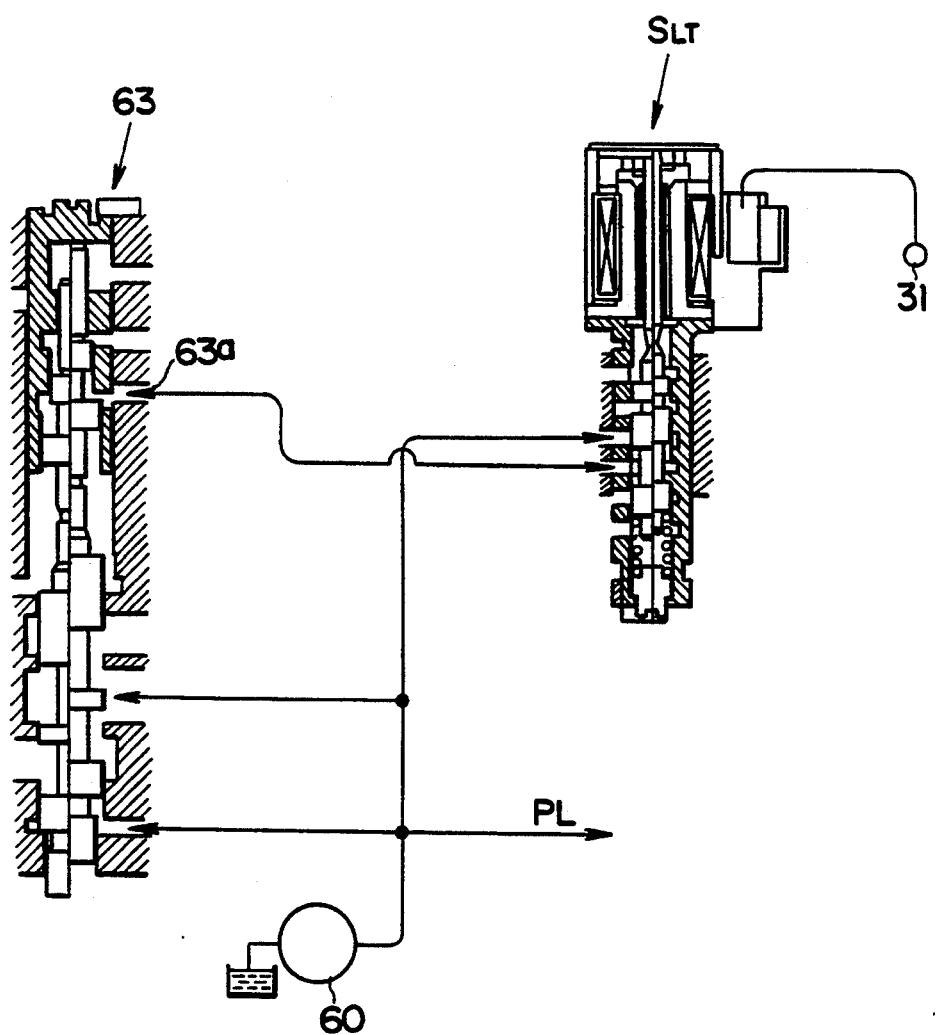
FIG. 23 is an oil pressure circuit showing a mechanism for regulating the line pressure.

Here will be described means for regulating the line pressure with reference to FIG. 23. As shown, the primary regulator valve 63 has its port 63a fed with the signal pressure of the linear solenoid valve SLT, and this signal pressure acts against the oil pressure established in the pump 60 so that the line pressure is raised in accordance with the signal pressure.

Figure 24:
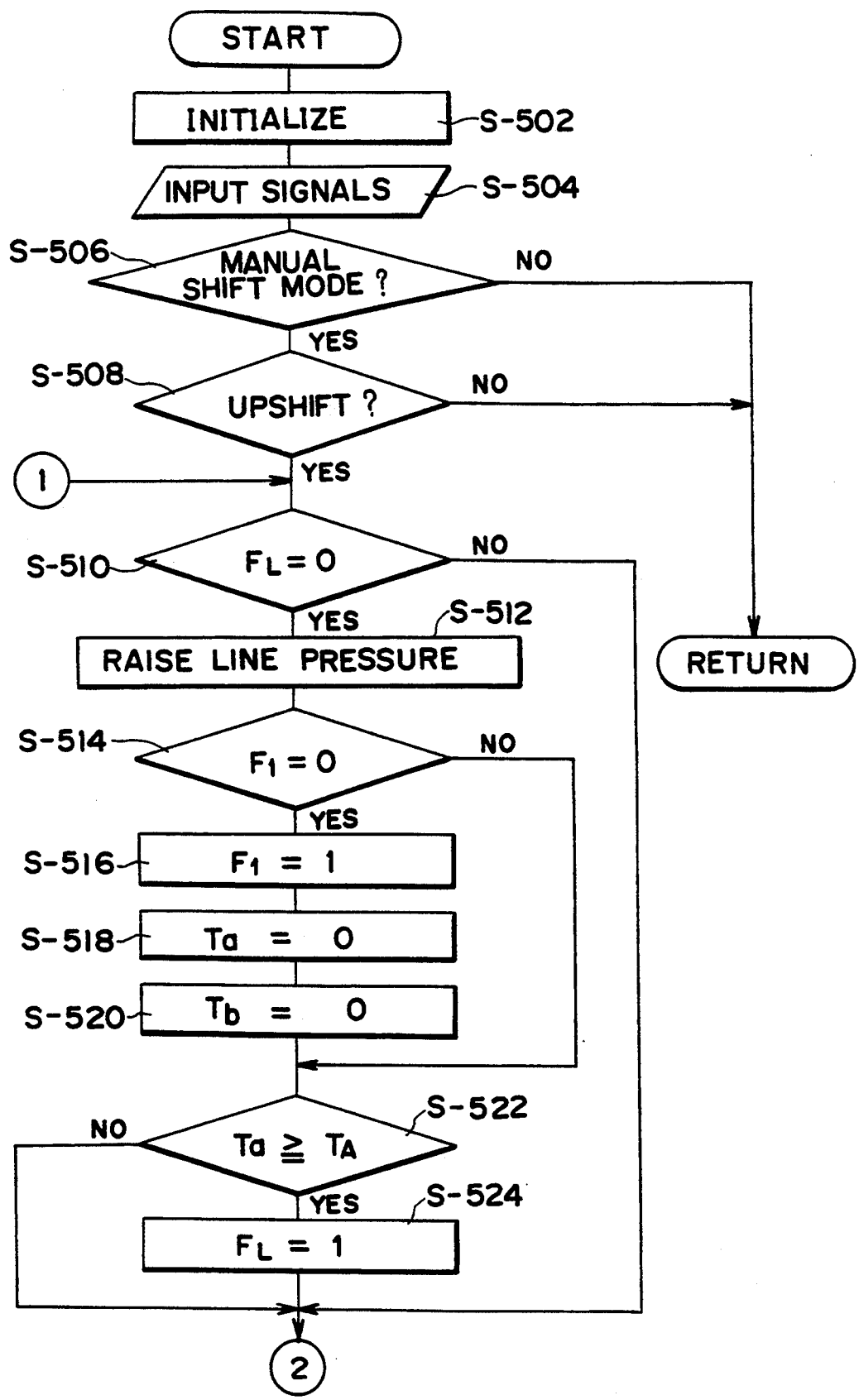
FIG. 24 is a flow chart showing a portion of the control routine for controlling the learning of the pressure raising time.
Figure 25:
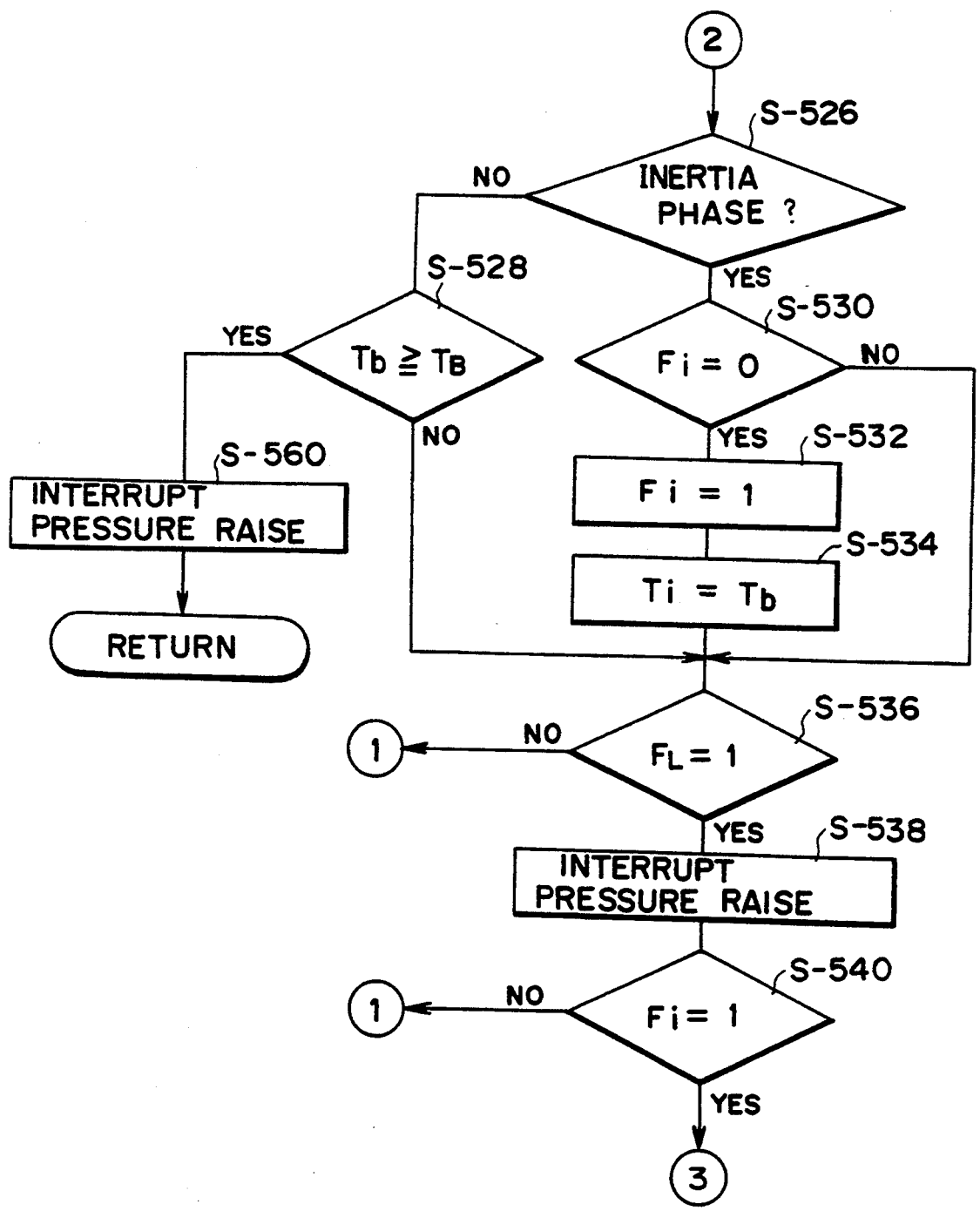
FIG. 25 is a flow chart showing another portion of the control routine for controlling the learning of the pressure raising time.
Figure 26:
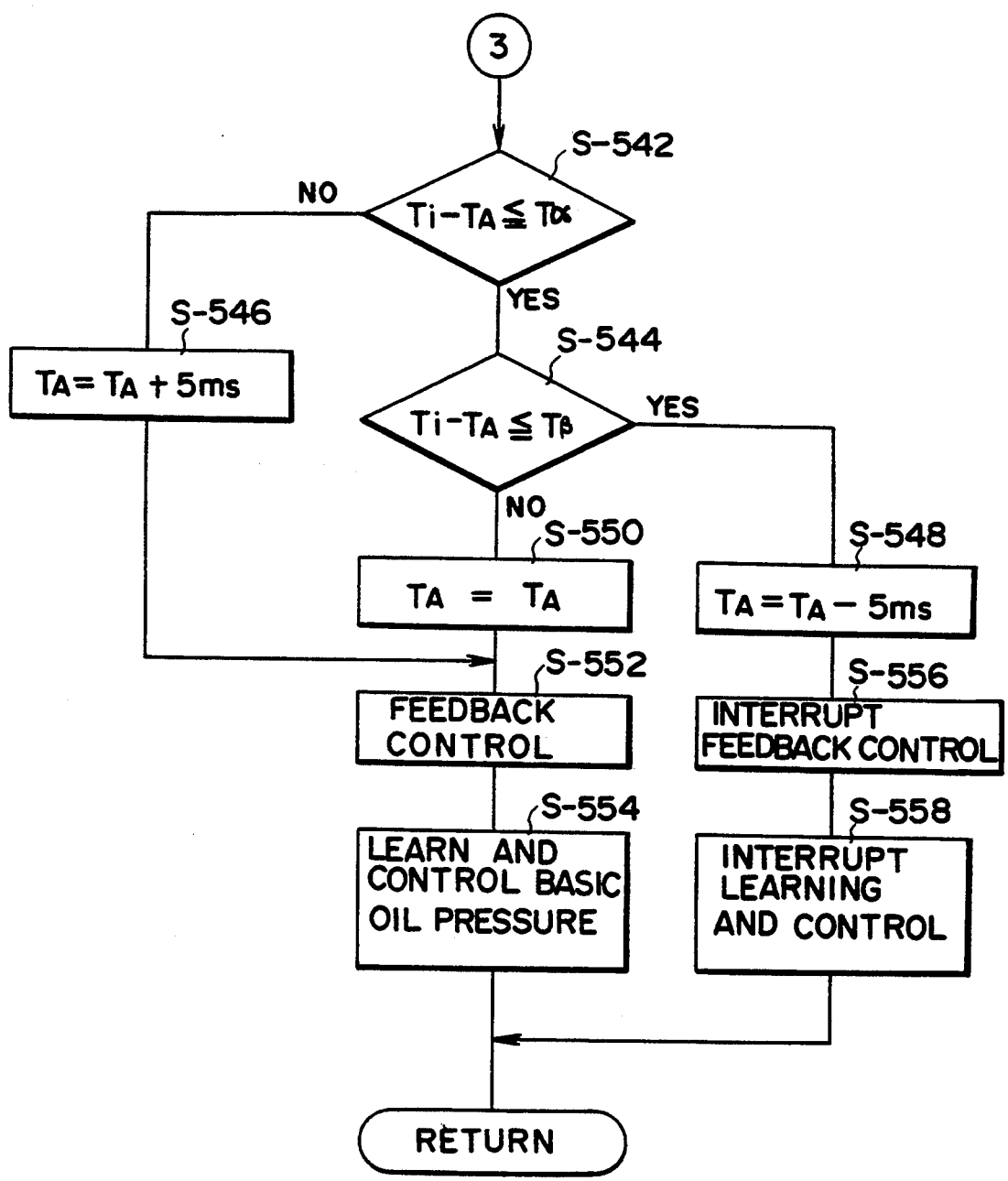
FIG. 26 is a flow chart showing still another portion of the control routine for controlling the learning of the pressure raising time.

Here will be described with reference to FIGS. 24 to 26 the learning control for raising the line pressure till the start of the inertia phase.

Step S-502: The control data are initialized.

Step S-504: The signals are inputted from the various sensors.

Step S-506: It is decided whether the manual shift mode is selected. If the automatic shift mode is selected, the routine is returned without any special control. If the manual shift mode is selected, the routine advances to Step S-508.

Step S-508: It is decided whether the decision of an upshift holds. If the answer is NO, the routine is returned without any special control. If the answer is YES, the routine advances to Step S-510.

Step S-510: It is decided whether a flag FL is reset to zero. This flag FL indicates, if set to "1", that a timer Ta has counted up a pressure raise time TA. The routine advances to Step S-512, if the flag FL is reset to zero, but to Step S-526 if to "1".

Step S-512: The control of raising the line pressure is executed. Specifically, this control is carried out by raising the signal pressure outputted by the linear solenoid valve SLT. This control may be started either simultaneously with the decision of the upshift or after a predetermined time has lapsed from the decision of the upshift.

Step S-514: It is decided whether a flag F1 is reset to zero. This flag F1 is one which is set to "1" if the raise control of the line pressure is executed. The routine advances to Step S-516, if the flag F1 is reset to zero, but to Step S-522 if the same is reset to "1".

Step S-516: The flag F1 is set to "1".

Step S-518: The timer Ta is reset to zero, and the time counter is started.

Step S-520: A timer Tb is reset to zero, and the time counter is started.

Step S-522: It is decided whether the timer Ta exceeds the pressure raise time TA, that is, whether the pressure raise time is counted up. The routine advances to Step S-524, if the time period TA has elapsed from the start of the pressure raise control, but to Step S-526 if NOT. Incidentally, the initial value of the pressure raise time TA is set in accordance with the throttle opening θ and the kind of the shift, as shown in FIG. 27, and is stored in the form of a map.

Step S-526: It is decided whether the inertia phase has been started in the state of a shift transition. In case of an upshift, this decision can be made on the basis of the turbine RPM, the output shaft RPM, the gear ratio before the shift and a predetermined constant, as has been described hereinbefore. The routine advances to Step S-528, if the inertia phase is not started, but to Step S-530 if the phase is started.

Step S-528: It is decided whether the counted value of the timer Tb exceeds a predetermined time period TB. This time period TB is one which is set by a guard timer for interrupting the raise control of the line pressure if the start of the inertia phase is not detected for some cause. The routine advances to Step S-560, if the answer is YES, but to Step S-536 if the answer is NO.

Step S-530: It is decided whether a flag Fi is reset to zero. This flag Fi indicates, if set to "1", that the inertia phase has started. The routine advances to Step S-532, if the flag Fi is reset to zero, but to Step S-536 if the flag Fi is set to "1".

Step S-532: The flag Fi is set to "1".

Step S-534: The counted time of the timer Tb is latched as the inertia phase start time.

Step S-536: It is decided whether the flag FL is set to "1". The routine returns to the upstream of Step S-510 to continue the raise of the line pressure, if the flag FL is not set to "1", but to Step S-538 if the flag FL is set to "1".

Step S-538: The control of raising the line pressure is interrupted. Specifically, the line pressure is returned to the level which is set at the shifting time in the automatic shift mode.

Step S-540: It is decided whether the flag Fi is set to "1". Since this flag Fi is set to "1" by the start of the inertia phase, the routine is returned to the upstream of Step S-510 to continue the raising control of the line pressure if the flag Fi is not set to "1". If set to "1", on the other hand, the routine advances to Step S-542.

Step S-542: It is decided whether the difference between the time Ti till the start of the inertia phase to the pressure raising time TA is smaller than a predetermined allowable value Tα(>0). The routine advances to Step S-546, if the time difference is larger than the allowable value Tα, but to Step S-544 if smaller than the allowable value Tα.

Step S-544: It is decided whether the difference between the time Ti till the start of the inertia phase to the pressure raising time TA is smaller than a predetermined allowable valve Tβ(<0). The routine advances to Step S-550, if the time difference is larger than the allowable value Tβ, but to Step S-548 if smaller than the allowable value Tβ.

Step S-546: The pressure raising time TA is elongated by 5 msecs. Specifically, this Step is executed in case the pressure raising time TA is shorter by the allowable value Tα or more than the time Ti till the start of the inertia phase. In this case, therefore, the pressure raising time TA is elongated by 5 msecs., for example, and the elongated time is adopted as the pressure raising time for the next trial. Then, the routine advances to Step S-552.

Step S-548: The pressure raising time TA is shortened by 5 msecs. Specifically, this Step is executed in case the pressure raising time TA is longer by the allowable value Tβ or more than the time Ti till the start of the inertia phase. In this case, therefore, the pressure raising time TA is shortened by 5 msecs., for example, and the shortened time is adopted as the pressure raising time for the next trial. Then, the routine advances to Step S-556.

Step S-550: The existing value is adopted as it is as the pressure raising time TA. Specifically, this Step is executed in case the difference between the pressure raising time TA and the time till the start of the inertia phase is within an allowable range, and the pressure raising time TA is not elaborately changed. Then, the routine advances to Step S-552.

Step S-552: The engaging pressure of the frictional engagement means is subjected to a feedback control. This controls the engaging pressure on real time so that the shifting time may fall at a fixed instant.

Step S-554: A basic oil pressure learning control is executed to optimize the initial value (or basic value) of the engaging pressure to be fed to the frictional engagement means. This control is carried out in the prior art, too, and has no especial relation to the present invention so that its description will be omitted.

Step S-556: The feedback control of the engaging pressure of the frictional engagement means is interrupted. Since, in this case, the raising control of the line pressure continues even after the inertia phase has started, the raising control of the engaging pressure is interrupted to prevent deterioration of the shifting shock.

Step S-558: The basic oil pressure learning control for optimizing the initial value (or basic value) of the engaging pressure to be fed to the frictional engagement means is interrupted.

Step S-560: The raising control of the line pressure is interrupted. Specifically, the signal pressure outputted from the linear solenoid valve SLT is dropped to the level at the shifting in the automatic shift mode. In short, this Step determines the control which is to be executed in case the inertia phase fails to be started even if the time set by the guard timer is passed. In this case, the raising control of the line pressure is interrupted because some failure has occurred.

Figure 28:
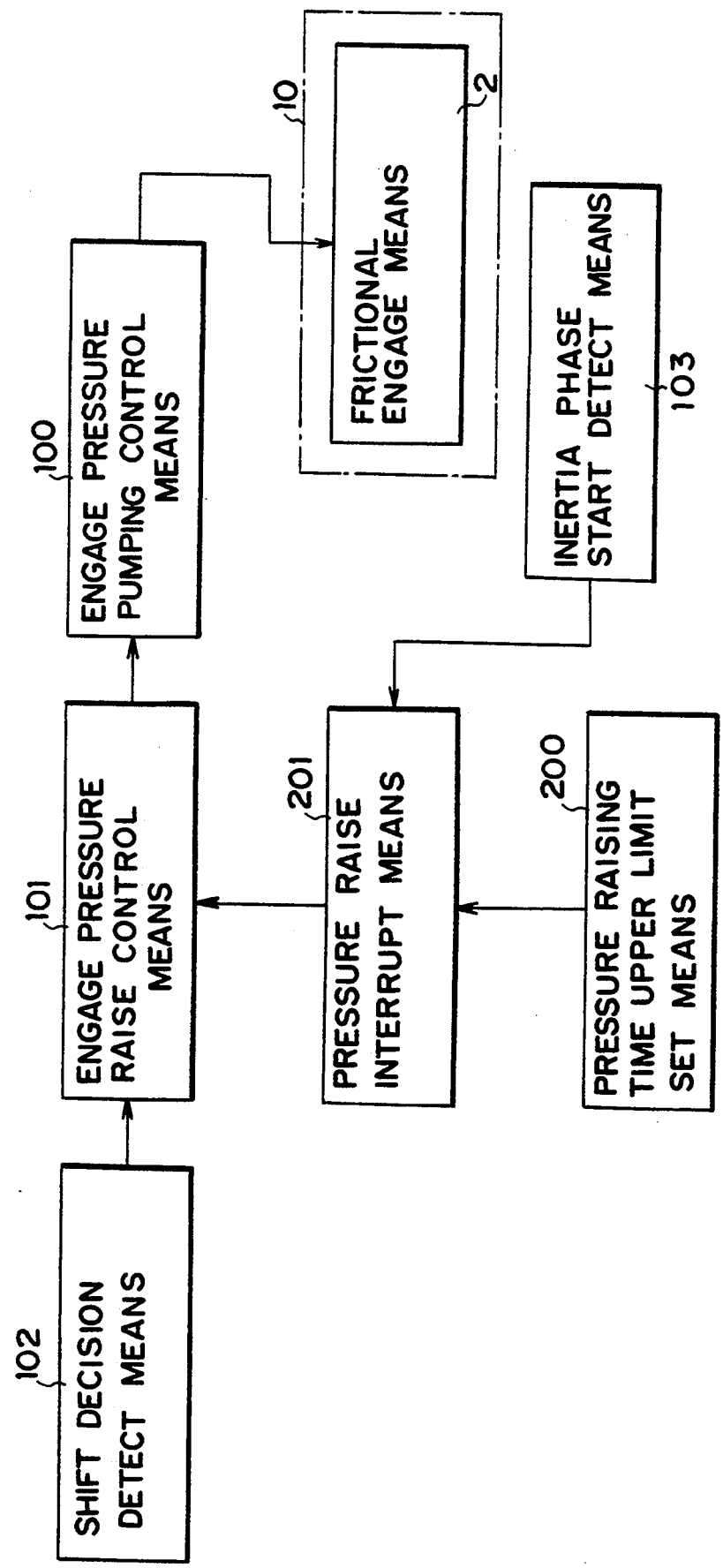
FIG. 28 is a block diagram showing a control system for preventing the raise of the engage pressure from excessive continuation, with functional means.

The controls of the aforementioned Step S-528 and Step S-560 are executed by the arithmetic processing in the electronic control unit 31 and by outputting the control signal from the electronic control unit 31 to the oil pressure circuit 5. This control system is expressed by functional means in FIG. 28. Specifically, if the detected signal is outputted from the inertia phase start detecting means 103 while the time period set by pressure raising time upper limit setting means 200 is being counted, pressure raise interrupting means 201 will not output an interrupt signal. If the detected signal is not outputted from the inertia phase start detecting means 103 while the time period set by the pressure raising time upper limit setting means 200 is being counted, the pressure raise interrupting means 201 outputs the interrupt signal to the engaging pressure raise control means 101 so that the raising control of the engaging pressure is interrupted.

Incidentally, the shortening of the time lag at the shifting time may preferably be carried out at a shifting time in the manual shift mode when the vehicle is running at a considerable speed. Specifically, the acceleration in case of transition from a completely or substantially stopped state to an ordinary run is physically felt stronger than that of the case in which the vehicle is running at a speed higher than a considerable value. Even at the start in the manual shift mode, therefore, it is more advantageous for reducing the shifting shock that the time lag for the shifting for this run is considerably long. Here will be described an embodiment of the raising control of the engaging pressure in case the switch SW1 shown in FIG. 10, for example, is turned ON by moving the shift lever from the neutral range position to the position of the gear stage in the manual shift mode.

Figure 29:
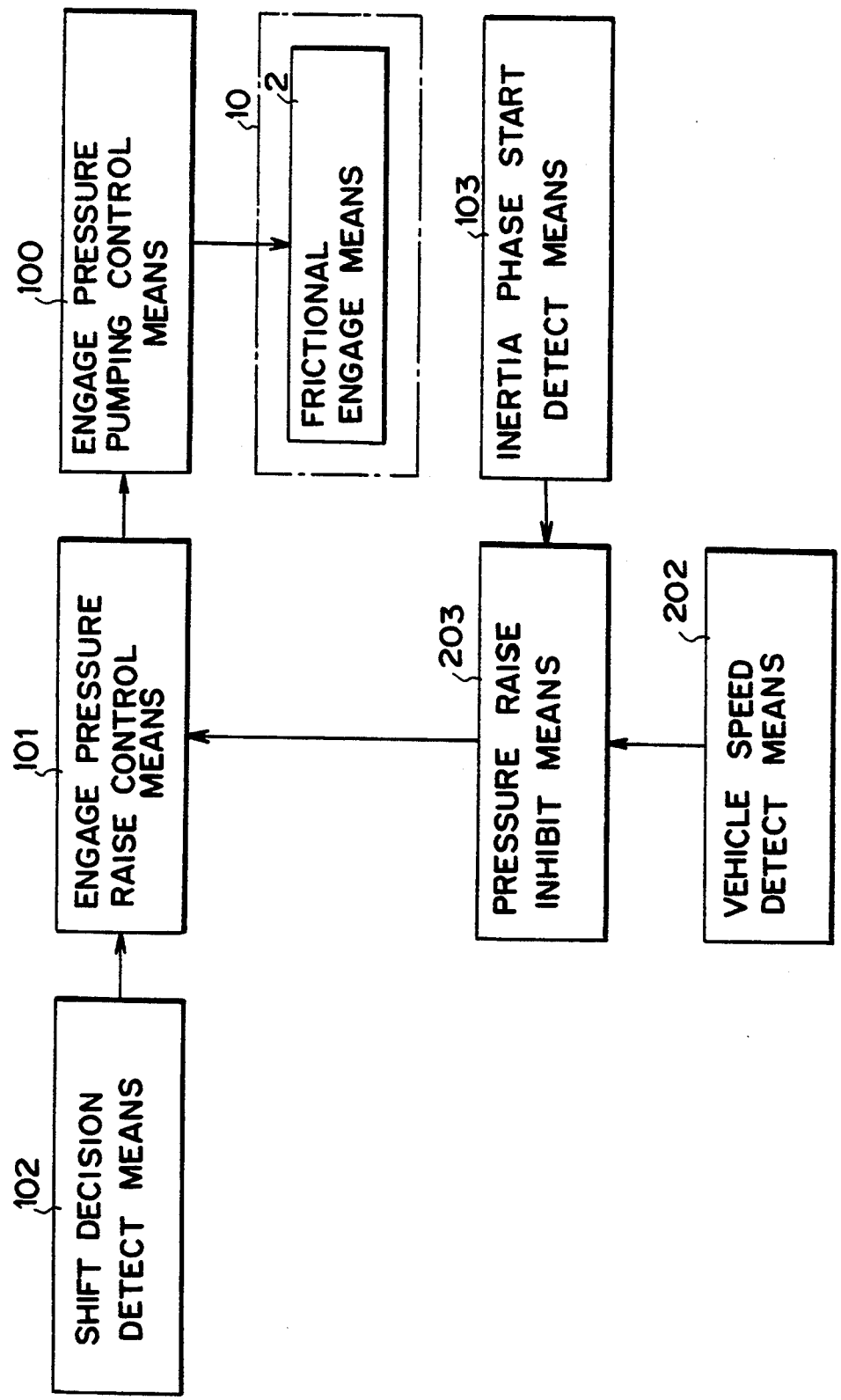
FIG. 29 is a block diagram showing a control system for inhibiting the raise control of the engage pressure at a low vehicle speed, with functional means.

FIG. 29 is a block diagram showing the control system schematically by functional means. Vehicle speed detecting means 202 detects a vehicle speed V in terms of the input signal coming from the vehicle speed sensor SP1 (or SP2). Moreover, this vehicle speed detecting means 202 outputs its signal to pressure raise inhibiting means 203 if its detected vehicle speed V is lower than a predetermined reference value (e.g., 9 Km/h). In response to the signal from the vehicle speed detecting means 202, the pressure raise inhibiting means 203 outputs its inhibit signal to the engaging pressure control means 101 to inhibit the raising control of the engaging pressure. In this case, therefore, the engaging pressure is kept at the level of the shifting time in the automatic shift mode.

Figure 30:
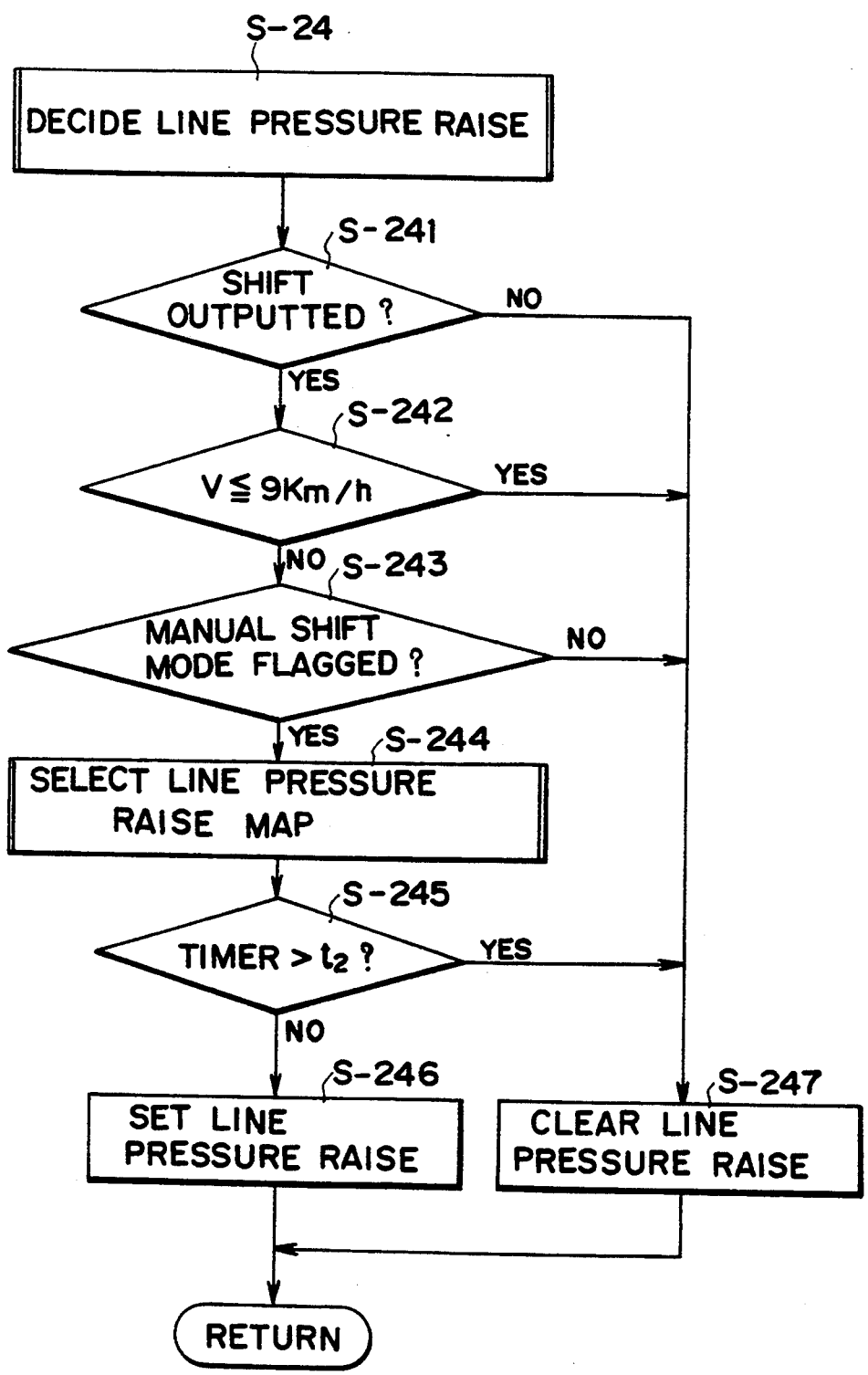
FIG. 30 is a flow chart showing a control routine for inhibiting the raise control of the engage pressure at a low vehicle speed.
Figure 31:
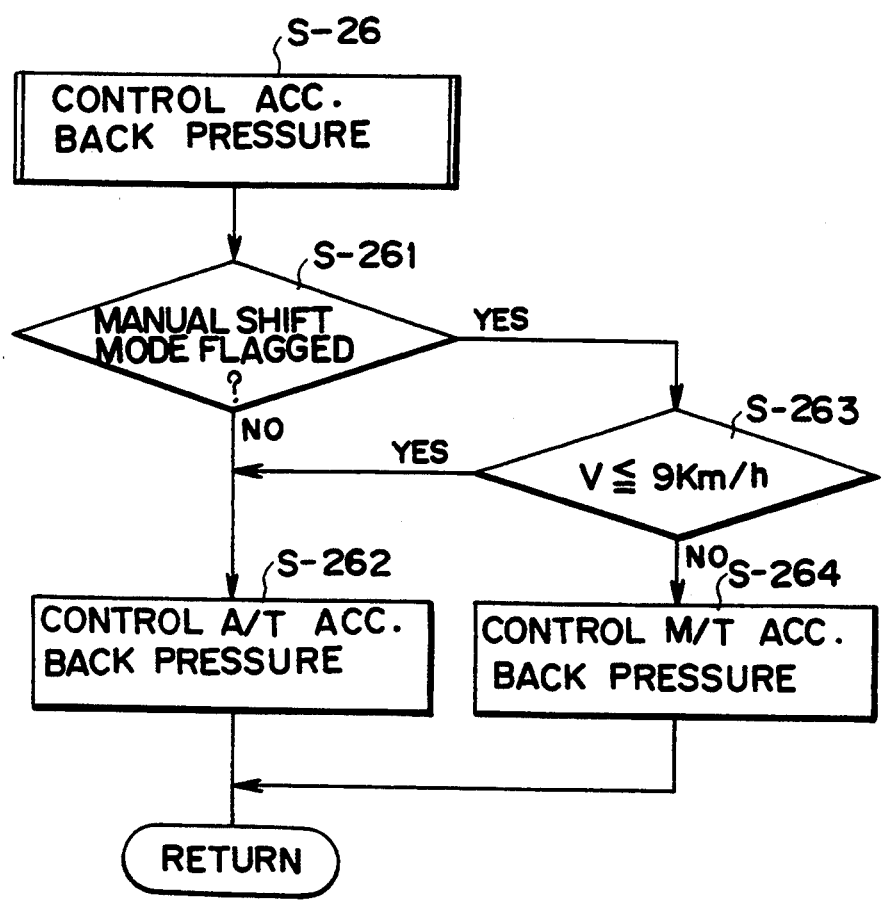
FIG. 31 is a flow chart showing a control routine for inhibiting the raise control of an accumulator back pressure the engage pressure at a low vehicle speed.

One example of the engaging pressure control routine including the aforementioned inhibition of the engaging pressure based on the vehicle speed V is shown in FIG. 30 and 31.

FIG. 30 is a flow chart a routine replacing the aforementioned subroutine shown in FIG. 14.

Step S-241: It is decided whether a shift is outputted. Without the shift output, the routine advances to Step S-247, at which the raised value of the line pressure is cleared. If the line pressure raise is not set yet, the routine is returned.

Step S-242: It is decided whether the vehicle speed V is lower than a predetermined reference value (e.g., 9 Km/h). The routine advances to Step S-247, if answer is YES, but to Step S-243 if the answer is NO.

Step S-243: If the detected vehicle speed V exceeds the reference value, it is decided whether the manual shift mode flag at Step S-12 of FIG. 7 is ON. The routine advances to Step S-244, if ON, but to Step S-247, if OFF, to clear the line pressure raise.

Step S-244: The line pressure raise map is selected so as to raise the line pressure in accordance with the kind of one of the gear stages. This line pressure raise map will be described hereinafter.

Step S-245: It is decided whether the counted value of the timer, which has its counting operation started when the shift is decided from the ON of the manual shift mode flag, exceeds a time $t_2$ which is read from the map. The start of the inertia phase is decided in terms of the lapse of time. The routine advances to Step S-247, if the answer of decision is YES, but to Step S-246 if the answer is NO.

Step S-246: If the predetermined time has not elapsed yet, that is, if it is decided that the inertia phase is not started, the line pressure raise is set.

Step S-247: If it is decided that the predetermined time has elapsed so that the inertia phase is started, the line pressure raise is cleared.

On the other hand, FIG. 31 shows an example of the routine for the rising control of the engaging pressure by controlling the back pressure of the accumulator. This control routine exemplifies the content of the subroutine of Step S-26 shown in FIG. 8.

Step S-261: It is decided whether the manual shift mode flag is ON. The routine advances to Step S-262, if the flag is OFF, but to Step S-263 if the flag is ON.

Step S-262: The accumulator back pressure is controlled in accordance with the shift in the automatic shift mode.

Step S-263: It is decided whether the vehicle speed V is lower than a predetermined reference value (e.g., 9 Km/h). The routine advances to Step S-262, if Yes, but to Step S-264 if NO.

Step S-264: The control of the accumulator back pressure according to the shift in the manual shift mode is executed.

In the aforementioned individual examples of the pressure raising control, the engaging pressure is dropped simultaneously as the pressure drop condition such as the start of the inertia phase is satisfied, in case the engaging pressure is to be dropped with the start of the inertia phase. If the control is delayed, however, the engaging pressure remains high even after the inertia phase is started, so that the shifting shock may possibly increase or that the frictional engagement means may possibly have their durabilities degraded. In order to avoid these disadvantages in advance, it is sufficient to accomplish the following pressure raising control.

Figure 32:
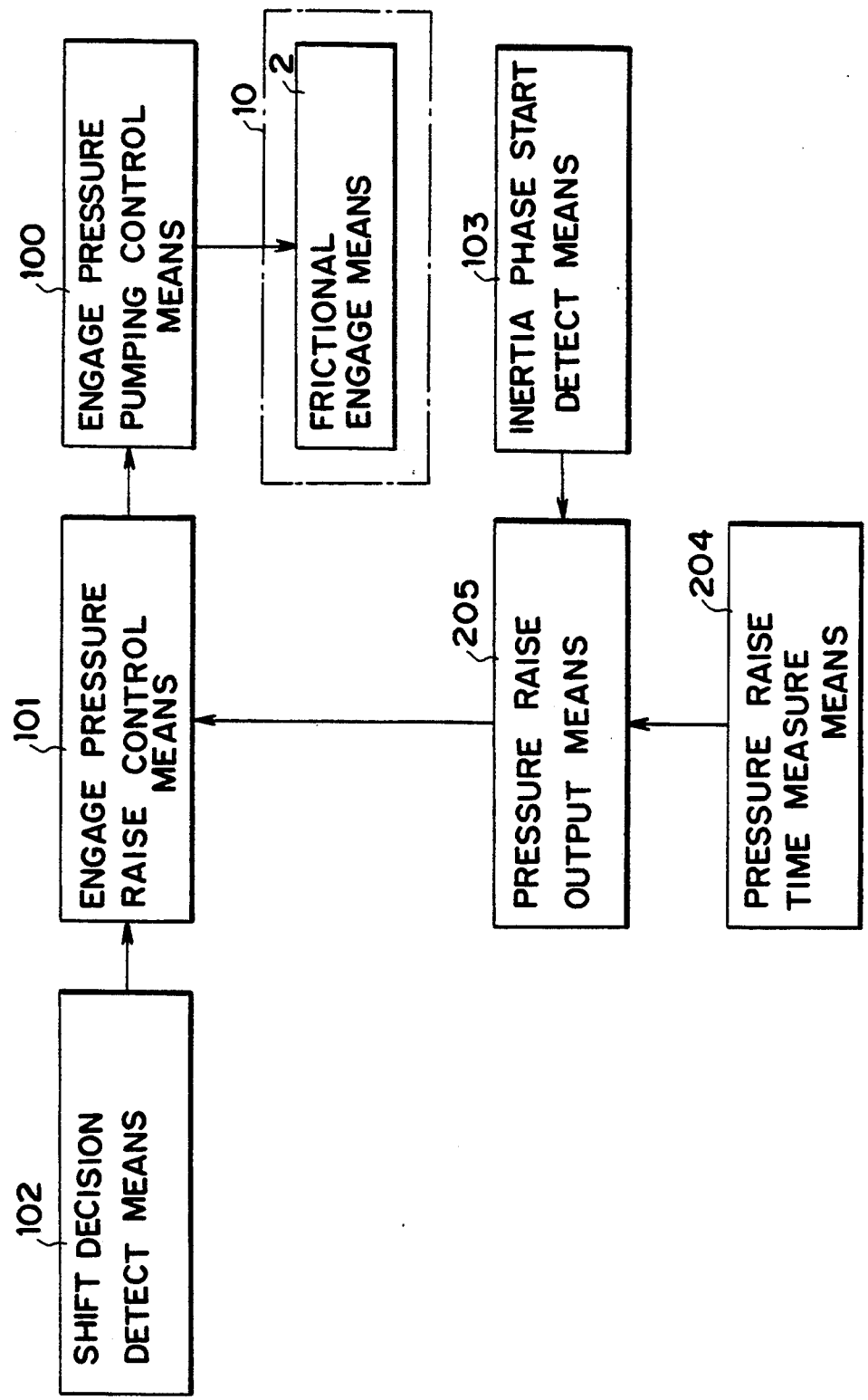
FIG. 32 is a block diagram showing a system for dropping the raised engage pressure gradually, with functional means.

FIG. 32 is a block diagram showing a pressure raise control system for additionally falling the engaging pressure stepwise. The time period from the start of the raising control of the engaging pressure is measured by pressure raise time measuring means 204, which outputs its signal indicating the time period to pressure raise output means. This pressure raise output means 205 is stored with a plurality of pressure raise levels according to the kinds of shifts, the throttle opening or the lapse time from the start of the pressure raise and outputs a pressure raise level according to the time inputted from the pressure raise time measuring means 204, to the engaging pressure raising means 101. As a result, the engaging pressure of the frictional engagement means 2 is raised by the engaging pressure raise control means 101 and the engaging pressure pumping control means 100.

Figure 33:
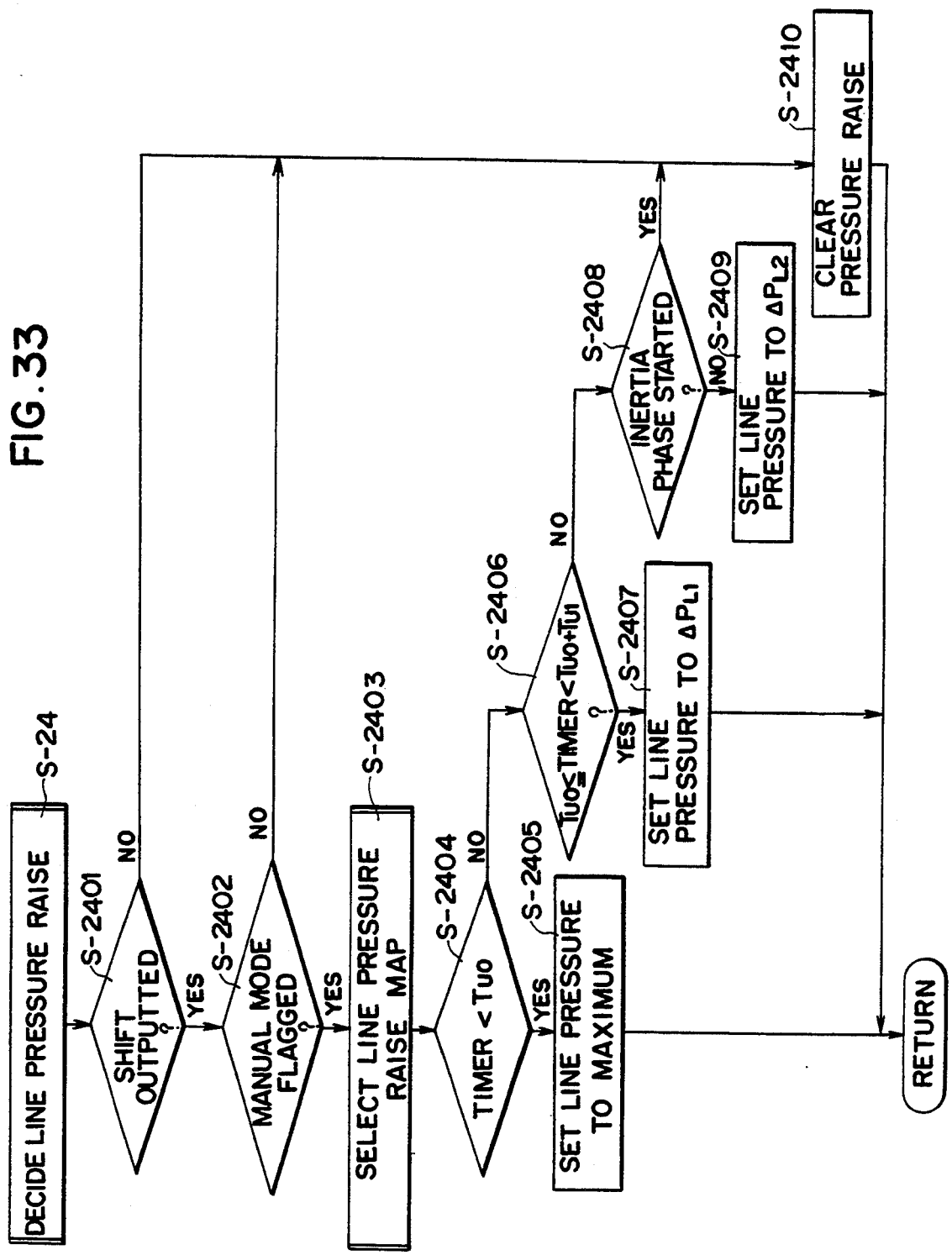
FIG. 33 is a flow chart showing a control routine for the system.

A specific control routine is shown in FIG. 33. This control routine can take place of the aforementioned subroutines shown in FIG. 14 and FIG. 30.

Step S-2401: It is decided whether a shift is outputted. If the answer is NO, the routine advances to Step S-2410 to clear the raised value of the line pressure. If this line pressure raise is not set yet, the routine is returned.

Step S-2402: If the shift output is executed, it is decided whether the manual shift mode flag of Step S-12 of FIG. 7 is ON. Then, the routine advances to Step S-2403, if the flag is ON, but to Step S-2410 to clear the line pressure raise if the flag is OFF.

Step S-2403: In order to raise the line pressure corresponding to the kind of one of the gear stages, the line pressure raise map is selected. This line pressure raise map will be described hereinafter.

Step S-2404: It is decided whether the lapse time period from the shift output, i.e., the counted value of the timer is smaller than a first time period $T_{uo}$ read from the map. Then, the routine advances to Step S-2405, if the first time period $T_{uo}$ is not elapsed, but to Step S-2406 if the first time period $T_{uo}$ is reached.

Step S-2405: The raised value of the line pressure is set to the maximum read from the map.

Step S-2406: It is decided whether the lapse time from the shift output, i.e., the counted value of the timer is larger than the first time period $T_{uo}$ and smaller than the time period, which is the sum of the first time period $T_{uo}$ and a predetermined short time period $T_{u1}$. This added time period of the first time period $T_{uo}$ and the short time period $T_{u1}$ is one for which the Inertia phase is not started. The routine advances to Step S-2407, if the answer is YES, but to Step S-2408 if the answer is NO.

Figure 34:
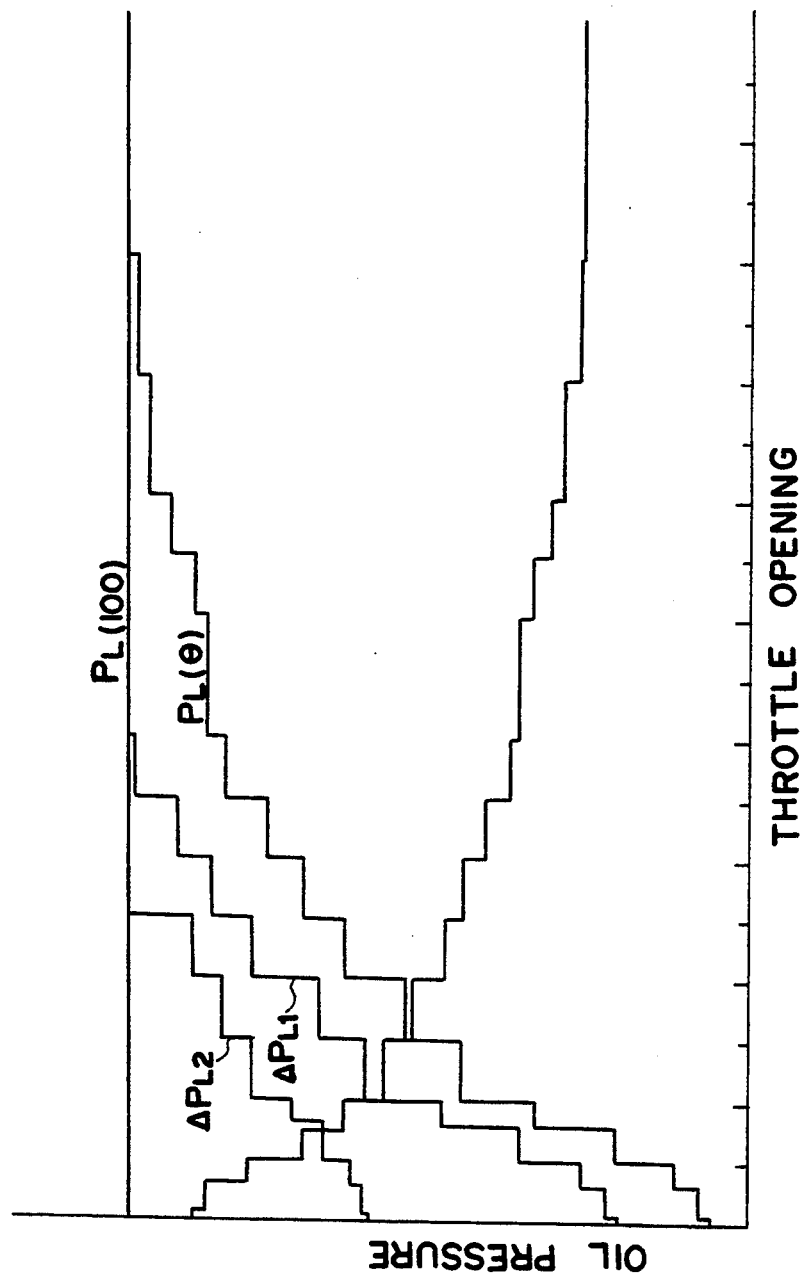
FIG. 34 shows one example of a map of the line pressure which is set in accordance with a throttle opening.

Step S-2407: The line pressure is set to $\Delta P_{L1}$. This pressure level $\Delta P_{L1}$ corresponds to the throttle opening, as exemplified in FIG. 34.

Step S-2408: It is decided whether the inertia phase is started. This decision can be performed in terms of the turbine RPM, the output shaft RPM, the gear ratio before the shift, and the constant $\alpha$ estimating an error. Then, the routine advances to Step S-2409, if the decision answer is NO, but to Step S-2410 if the answer is YES.

Step S-2409: The line pressure is set to $\Delta P_{L2}$. This pressure level $\Delta P_{L2}$ is set to a lower value than the aforementioned level $\Delta P_{L1}$ in accordance with the throttle opening, as exemplified in FIG. 34.

Step S-2410: The raised line pressure level is cleared.

In the control shown in FIG. 33, therefore, the line pressure is once raised to the maximum after the shift output and is then dropped stepwise by the starting time of the inertia phase. As a result, the raised level of the line pressure is low at the starting time of the inertia phase so that the line pressure can be prevented in advance from excessively rising at the starting time of the inertia phase.

Figure 35:
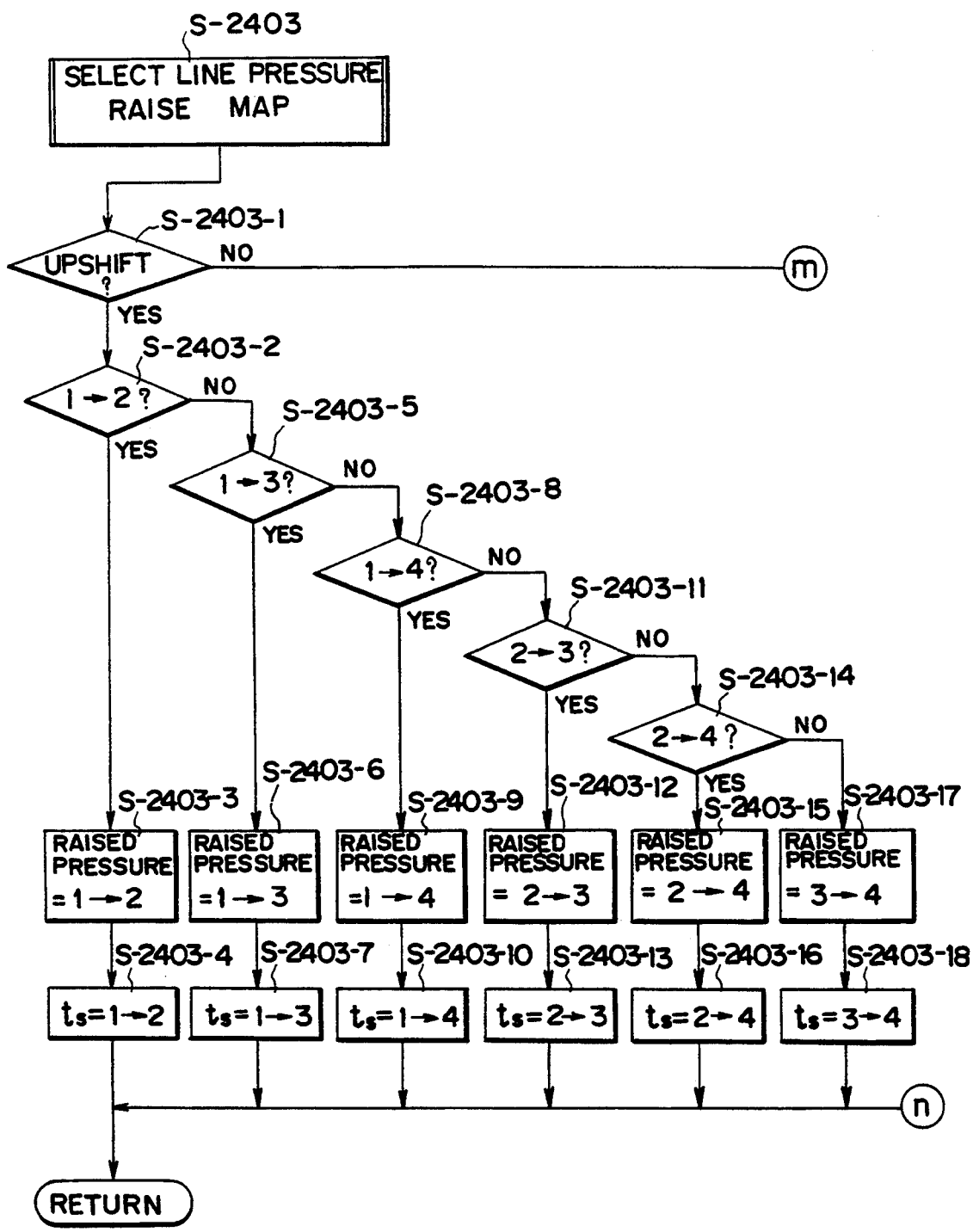
FIG. 35 is a flow chart showing a portion of a control routine for selecting a raised pressure value and a raising time period from the map.
Figure 36:
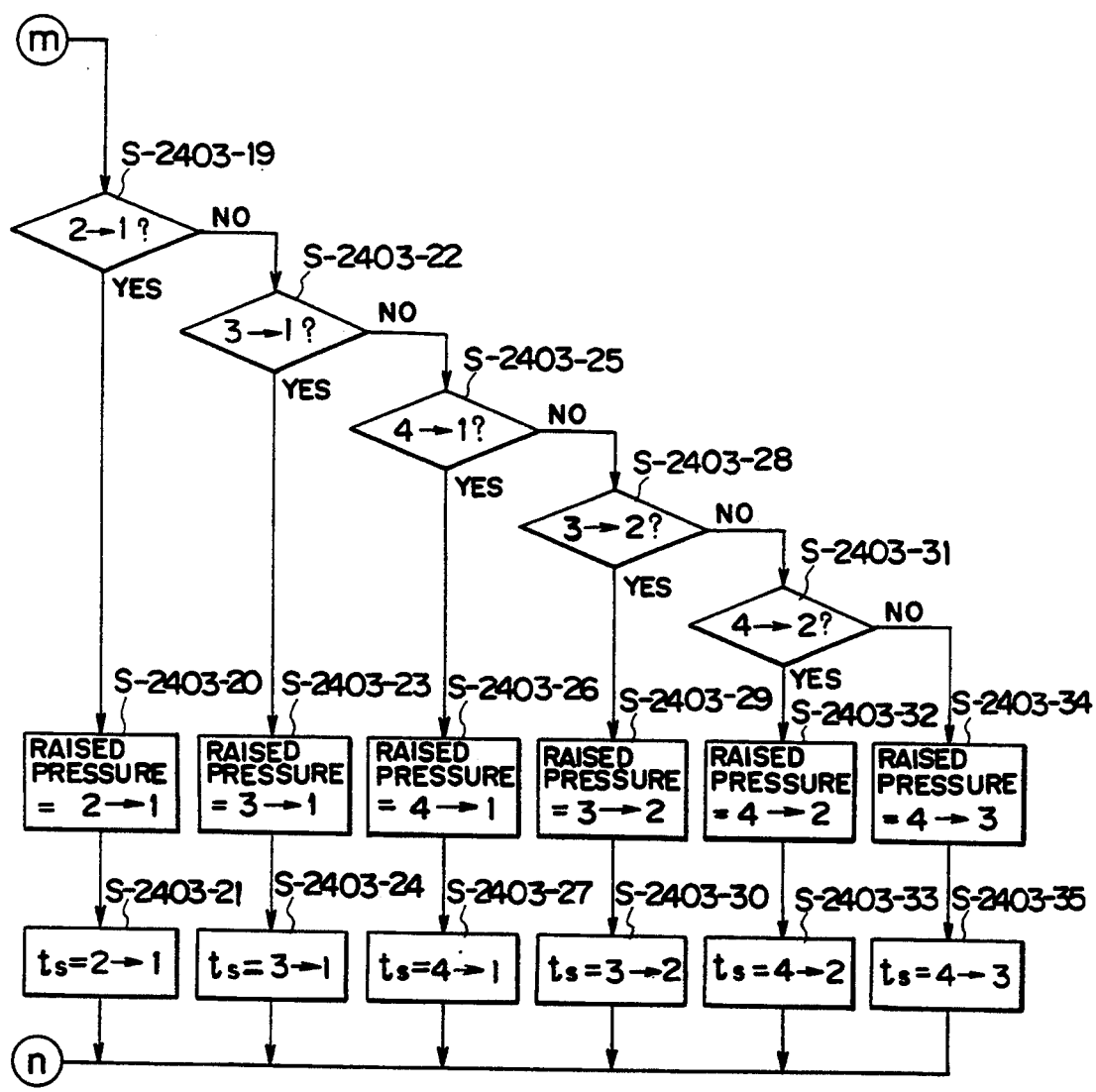
FIG. 36 is a flow chart showing another portion of a control routine for selecting a raised pressure value and a raising time period from the map.

With reference to FIGS. 35 and 36, here will be described the subroutine for the selecting control of the line pressure raise map to be executed at Step S-2403 of FIG. 33.

Step S-2403-1: It is decided whether the shift is an upshift. The routine advances to Step S-2403-2, if the shift is an upshift, but to Step S-2403-19 if the shift is a downshift.

Step S-2403-2: It is decided whether the shift is 1→2 speeds. The routine advances to Step S-2403-3, if the answer is YES, but to Step S-2403-5 if the answer is NO.

Steps S-2403-3 and 4: If in the 1→2 shift, the raised pressure value and pressure raising time $t_s$ corresponding to the 1→2 shift. Incidentally, this pressure raising time $t_s$ contains the aforementioned first time period $T_{u1}$ and a short time period $T_{u2}$ to be added to the former.

Step S-2403-5: It is decided whether the shift is 1→3 speeds. The routine advances to Step S-2403-6, if the answer is YES, but to Step S-2403-8 if the answer is NO.

Steps S-2403-6 and 7: If in the 1→3 shift, the raised pressure value and pressure raising time $t_s$ corresponding to the 1→3 shift.

Step S-2403-8: It is decided whether the shift is 1→4 speeds. The routine advances to Step S-2403-9, if the answer is YES, but to Step S-2403-11 if the answer is NO.

Steps S-2403-9 and 10: If in the 1→4 shift, the raised pressure value and pressure raising time $t_s$ corresponding to the 1→4 shift.

Step S-2403-11: It is decided whether the shift is 2→3 speeds. The routine advances to Step S-03-12, if the answer is YES, but to Step S-2403-14 if the answer is NO.

Steps S-2403-12 and 13: If in the 2→3 shift, the raised pressure value and pressure raising time $t_s$ corresponding to the 2→3 shift.

Step S-2403-14: It is decided whether the shift is 2→4 speeds. The routine advances to Step S-03-15, if the answer is YES, but to Step S-2403-17 if the answer is NO.

Steps S-2403-15 and 16: If in the 2→4 shift, the raised pressure value and pressure raising time $t_s$ corresponding to the 2→4 shift.

Steps S-2403-17 and 18: If in the 3→4 shift, the raised pressure value and pressure raising time $t_s$ corresponding to the 3→4 shift.

Step S-2403-19: It is decided whether the shift is 2→1 speeds. The routine advances to Step S-2403-20, if the answer is YES, but to Step S-2403-22 if the answer is NO.

Steps S-2403-20 and 21: If in the 2→1 shift, the raised pressure value and pressure raising time $t_s$ corresponding to the 2→1 shift.

Step S-2403-22: It is decided whether the shift is 3→1 speeds. The routine advances to Step S-2403-23, if the answer is YES, but to Step S-2403-25 if the answer is NO.

Steps S-2403-23 and 24: If in the 3→1 shift, the raised pressure value and pressure raising time $t_s$ corresponding to the 3→1 shift.

Step S-2403-25: It is decided whether the shift is 4→1 speeds. The routine advances to Step S-2403-26, if the answer is YES, but to Step S-2403-28 if the answer is NO.

Steps S-2403-26 and 27: If in the 4→1 shift, the raised pressure value and pressure raising time $t_s$ corresponding to the 4→1 shift.

Step S-2403-28: It is decided whether the shift is 3→2 speeds. The routine advances to Step S-2403-29, if the answer is YES, but to Step S-2403-31 if the answer is NO.

Steps S-2403-29 and 30: If in the 3→2 shift, the raised pressure value and pressure raising time $t_s$ corresponding to the 3→2 shift.

Step S-2403-31: It is decided whether the shift is 4→2 speeds. The routine advances to Step S-2403-32, if the answer is YES, but to Step S-2403-34 if the answer is NO.

Steps S-2403-32 and 33: If in the 4→2 shift, the raised pressure value and pressure raising time $t_s$ corresponding to the 4→2 shift.

Steps S-2403-34 and 35: If in the 4→3 shift, the raised pressure value and pressure raising time $t_s$ corresponding to the 4→3 shift.

Figure 37:
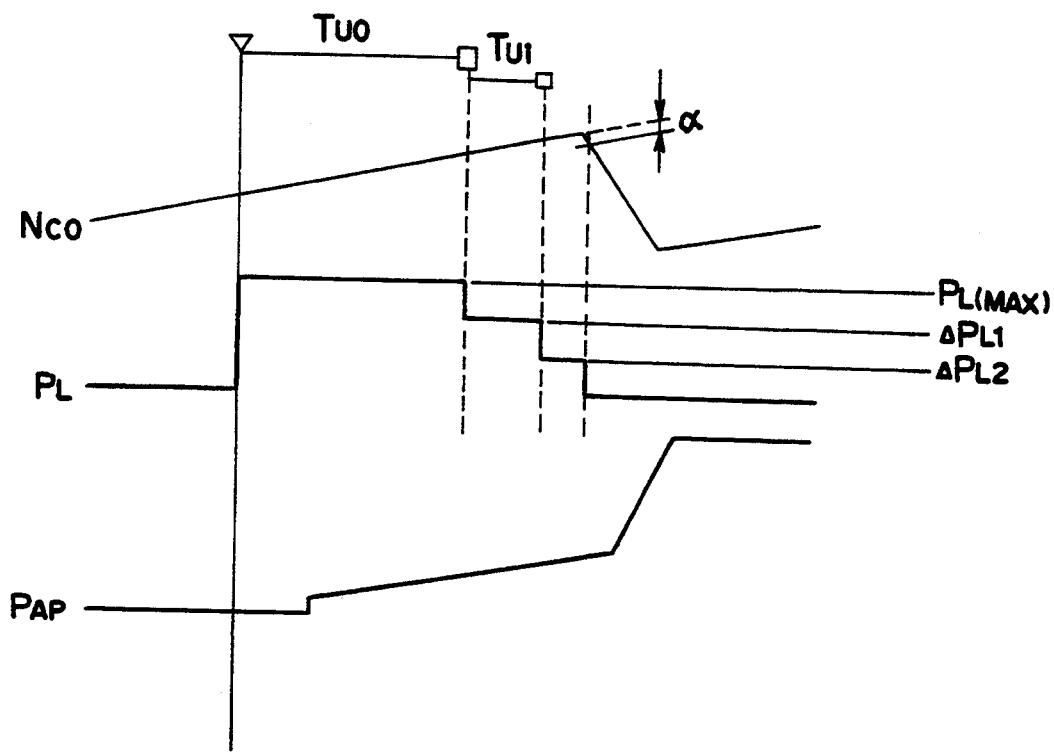
FIG. 37 is a time chart plotting changes in the line pressure and the engage pressure in case the line pressure is dropped stepwise.
Figure 38:
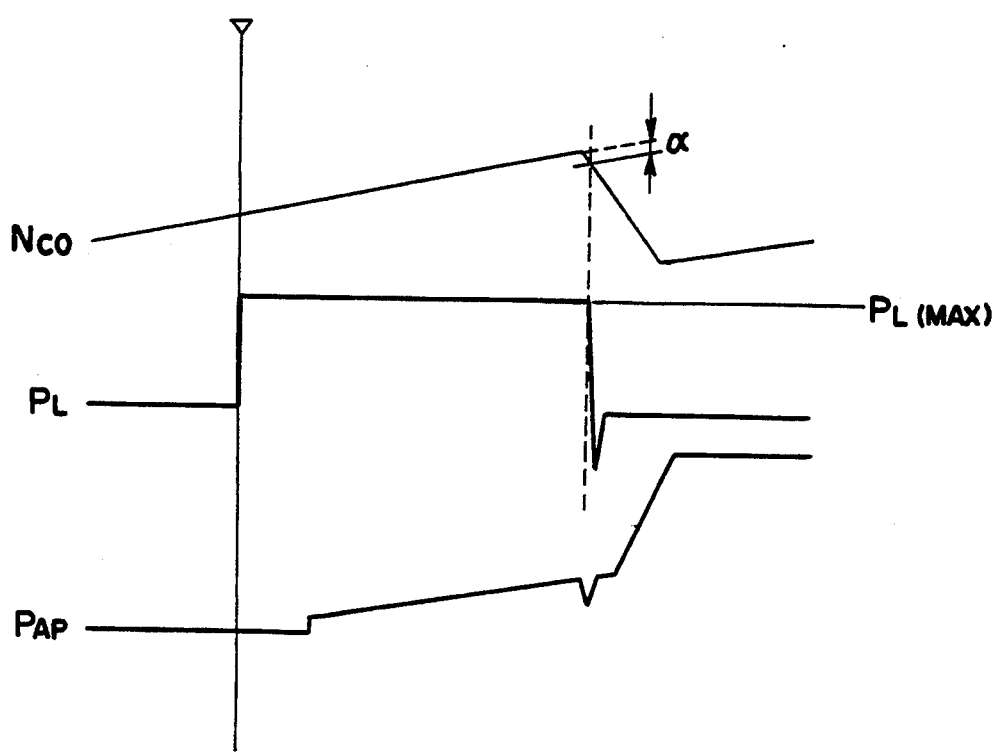
FIG. 38 is a time chart plotting changes in the line pressure and the engage pressure in case the pressure drop is not carried out stepwise.

The line pressure, as designated at $P_L$, and the engaging pressure, as designated at $P_{AP}$, of the aforementioned case, in which the line pressure is stepwise dropped, are plotted against time in FIG. 37. For comparison, the line pressure $P_L$ and the engaging pressure $P_{AP}$ without the stepwise pressure drop are plotted against time in FIG. 38. As could be seen from these Figures, the engaging pressure can be dropped to a proper level at the start of the inertia phase if the line pressure is stepwise dropped prior to the start of the inertia phase. Without the aforementioned pressure dropping control, on the contrary, the engaging pressure may temporarily fall immediately after the start of the inertia phase to cause deterioration of the shifting shock.

What is claimed is:

1. A shift control system for an automatic transmission including a plurality of frictional engagement means adapted to be hydraulically engaged for setting a plurality of gear stages, and a shift lever for switching between an automatic mode in which a gear stage is set on the basis of the running state of a vehicle and a manual mode in which a gear stage is switched by manipulating said shift lever, said switching of a gear stage comprising changing a gear ratio between an input shaft and an output shaft of said transmission, the improvement comprising:
shift detecting means for detecting that a gear stage should be selected for a shift in the manual; and
shift start timing means for accelerating, when the shift in the manual mode is detected, a switching rate of the frictional engagement means which are switched for executing the detected shift.

2. A shift control system according to claim 1, further comprising:
oil pressure regulating means for regulating the oil pressure to engage said frictional engagement means,
wherein said shift start timing means includes pressure raising means for raising the oil pressure to be regulated by said oil pressure regulating means to a higher level, if said shift detecting means detects the shift in the manual mode, than the oil pressure at the time of the shift detection by said shift detecting means.

3. A shift control system according to claim 2,
wherein said oil pressure regulating means includes means for controlling a line pressure, and
wherein said pressure raising means includes means for raising the line pressure.

4. A shift control system according to claim 2,
wherein said oil pressure regulating means comprises an accumulator connected to said frictional engagement means, and
wherein said pressure raising means includes means for raising the back pressure of said accumulator.

5. A shift control system according to claim 1,
wherein said frictional engagement means include a plurality of chambers for feeding an oil pressure to engage said frictional engagement means, and
wherein said shift start timing means includes means for changing the number of said chambers for feeding the oil pressure.

6. A shift control system according to claim 1, further comprising means for outputting a shift command signal after lapse of a predetermined time from the decision that a shift should be executed,
wherein said shift start timing means includes means for changing said predetermined time.

7. A shift control system according to claim 2,
wherein said pressure raising means includes means for raising said oil pressure for a time period from the shift command in the manual mode state to the actual start of the shift.

8. A shift control system according to claim 2, further comprising:
pressure raising time setting means for setting the time period for which the oil pressure is raised by said pressure raising means;
time measuring means for measuring the time period from the shift command in the manual mode state to the actual start of the shift;
time difference detecting means for determining the difference between the time period set by said pressure raising time setting means and the time period measured by said time measuring means; and
learning means for correcting the time period set by said pressure raising time setting means, on the basis of said difference detected by said time difference detecting means.

9. A shift control system according to claim 2, further comprising:
inertia phase detecting means for detecting the start of an inertia phase in the shift executed in the manual mode state; and
means for lowering the pressure, which has been raised by said pressure raising means, when said inertia phase is detected.

10. A shift control system according to claim 9, further comprising:

pressure raising continuation time detecting means for measuring a time period for which the oil pressure is raised by said pressure raising means; and interrupt means for interrupting raising of the oil pressure, when a time period detected by said pressure raising continuation time detecting means exceeds a predetermined time period without detection of the start of the inertia phase by said inertia phase detecting means.

11. A shift control system according to claim 2, wherein said pressure raising means includes: means for setting said oil pressure to a predetermined maximum for a predetermined first time period from the output of a shift command in the manual mode state to an inertia phase for starting the shift actually; and means for dropping, as time elapses, the oil pressure, which is controlled by said oil pressure regulating means after the lapse of said first time period to the start of said inertia phase, to the oil pressure at a shifting time in said automatic mode.

12. A shift control system according to claim 2, further comprising:

vehicle speed detecting means for detecting the vehicle speed; and inhibit means for inhibiting the raising of the oil pressure by said pressure raising means if the detected vehicle speed is lower than a preset vehicle speed, wherein said oil pressure regulating means includes means for setting said oil pressure to the pressure at a shifting time in the automatic mode if said inhibit means inhibits the pressure raising control.

* * * * *